(12) United States Patent
Balasubramanian et al.

(10) Patent No.: US 11,975,630 B2
(45) Date of Patent: May 7, 2024

(54) BATTERY MANAGEMENT SYSTEMS AND METHODS

(71) Applicant: Rivian IP Holdings, LLC, Irvine, CA (US)

(72) Inventors: Sundaresan Balasubramanian, Tustin, CA (US); Paul McLachlan, Bellevue, WA (US)

(73) Assignee: Rivian IP Holdings, LLC., Irvine, CA (US)

( * ) Notice: Subject to any disclaimer, the term of this patent is extended or adjusted under 35 U.S.C. 154(b) by 248 days.

(21) Appl. No.: 17/707,488

(22) Filed: Mar. 29, 2022

(65) Prior Publication Data

US 2023/0311702 A1 Oct. 5, 2023

(51) Int. Cl.
*B60L 58/12* (2019.01)
*G05B 13/02* (2006.01)
*G07C 5/00* (2006.01)
*G07C 5/08* (2006.01)

(52) U.S. Cl.
CPC .......... *B60L 58/12* (2019.02); *G05B 13/0265* (2013.01); *G07C 5/008* (2013.01); *G07C 5/085* (2013.01); *B60L 2240/14* (2013.01); *B60L 2240/26* (2013.01); *B60L 2240/547* (2013.01); *B60L 2240/549* (2013.01); *B60L 2240/622* (2013.01); *B60L 2240/662* (2013.01); *B60L 2240/70* (2013.01); *B60L 2260/20* (2013.01); *B60L 2260/46* (2013.01); *B60L 2260/52* (2013.01)

(58) Field of Classification Search
CPC .. B60L 58/12; B60L 2240/14; B60L 2240/26; B60L 2240/547; B60L 2240/549; B60L 2240/622; B60L 2240/662; B60L 2240/70; B60L 2260/20; B60L 2260/46; B60L 2260/52; G05B 13/0265; G07C 5/008; G07C 5/085
See application file for complete search history.

*Primary Examiner* — Mathew Franklin Gordon
(74) *Attorney, Agent, or Firm* — Foley & Lardner LLP

(57) ABSTRACT

Disclosed are systems and methods for updating of a machine learning model on a vehicle. A data processing system having at least one processor coupled with memory can predict a first value for a characteristic of the vehicle based at least on a model and measure a second value for the characteristic of the vehicle based at least on a sensor of the vehicle. The data processing system can determine a difference between the first value predicted based at least on the model and the second value measured is greater than a tolerance. The data processing system can identify a state of the vehicle associated with the difference between the first value and the second value and provide, in response to the difference determined greater than the tolerance, the state of the vehicle to a server remote from the vehicle to update the model.

20 Claims, 11 Drawing Sheets

BATTERY MANAGEMENT SYSTEMS AND METHODS

INTRODUCTION

Vehicles, such as electric vehicles, may be powered from their batteries. These batteries can be managed using systems monitoring the operation of the battery or the vehicle. The energy storage and consumption from the vehicle battery can vary based on varying usage and internal and external conditions and circumstances.

SUMMARY

A vehicle, such as an electric vehicle, can use one or more machine learning ("ML) models for managing the operation of the vehicle. These models can be trained using historical data to predict future values of vehicle characteristics corresponding to various aspects of the vehicle operation. Predicting future values of vehicle operation related characteristics can improve the operation and efficiency of the vehicle. Sometimes, a model can reliably predict characteristic values for situations that are captured by the historical data based on which the model is trained. However, when faced with rare conditions or circumstances on which the model is not sufficiently trained, the model may predict a value that deviates from a corresponding subsequent measurement or observation of that value. For example, a model can be trained to predict values corresponding to, or monitored by, a battery management system ("BMS"), such as for example a predicted state of charge of a battery or a temperature of a battery cell or a battery module. The model may accurately forecast such values (e.g., the state of charge or temperature of a battery cell or module) when the vehicle is driving in well-known conditions (e.g., cruise control on a flat highway). However, the model may not reliably predict such values in rare or otherwise less-known conditions, such as, for example, when the vehicle is driving in difficult conditions, such as off-roading on a snowy mountain. In such rare or less-known conditions the values of battery characteristics predicted by the model may deviate from the measured values of the same characteristics by more than an acceptable tolerance range. Determining an optimal forecast range or bandwidth for the model to predict such characteristics in the future can help improve vehicle's performance. The systems and methods described herein provide a solution for improving the ability of the model to predict modeled values of vehicle characteristics in rare or less-known conditions.

At least one aspect is directed to a system. The system can include a data processing system having at least one processor coupled with memory. The data processing system can predict a first value for a characteristic of the vehicle based at least on a model. The data processing system can measure a second value for the characteristic of the vehicle based at least on a sensor of the vehicle. The data processing system can determine a difference between the first value predicted based at least on the model and the second value measured based at least on the sensor is greater than a tolerance. The data processing system can identify a state of the vehicle associated with at least the difference between the first value or the second value. The data processing system can provide, based on the difference being greater than the tolerance, the state of the vehicle to a server remote from the vehicle to update the model.

At least one aspect is directed to a method. The method can include an act of predicting, by one or more processors of a vehicle, a first value for a characteristic of the vehicle based at least on a model trained via machine learning. The method can include an act of measuring, by the one or more processors, a second value for the characteristic of the vehicle based at least on a sensor of the vehicle. The method can include an act of determining, by the one or more processors, a difference between the first value predicted based on the model and the second value measured based on the sensor is greater than a tolerance. The method can include an act of identifying, by the one or more processors, a state of the vehicle associated with the difference between the first value and the second value. The method can include an act of providing, by the one or more processors based on the difference being greater than the tolerance, the state of the vehicle to a server remote from the vehicle to update the model using machine learning.

At least one aspect is directed to a system to maintain a model used by a plurality of vehicles. The system can include one or more servers having at least one processor, coupled to memory. The one or more servers can be configured to receive, from a first vehicle of a plurality of vehicles, via a network, a state of the first vehicle. The state of the first vehicle can be received in response to a difference. The difference can be between a first value and a second value. The first value can be a value of a characteristic predicted at a forecast range by the first vehicle with a model trained via machine learning. The second value can be a value of the characteristic measured by the first vehicle exceeding a tolerance at a first timestamp set based on the forecast range. The one or more servers can receive, from a second vehicle of the plurality of vehicles, via the network, a state of the second vehicle. The state of the second vehicle can be received in response to a difference between a third value and a fourth value. The third value can be a value of the characteristic predicted at the forecast range the second vehicle with the model. The fourth value can be a value of the characteristic measured by the second vehicle exceeding the tolerance at a second timestamp set based on the forecast range. The one or more servers can update, via machine learning and based on the state of the first vehicle and the state of the first vehicle, the model to cause the model to make predictions that satisfy the tolerance using a second forecast range that is different than the forecast range. The one or more servers can provide at least one of the first value, the second value, the third value or the fourth value to a display.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
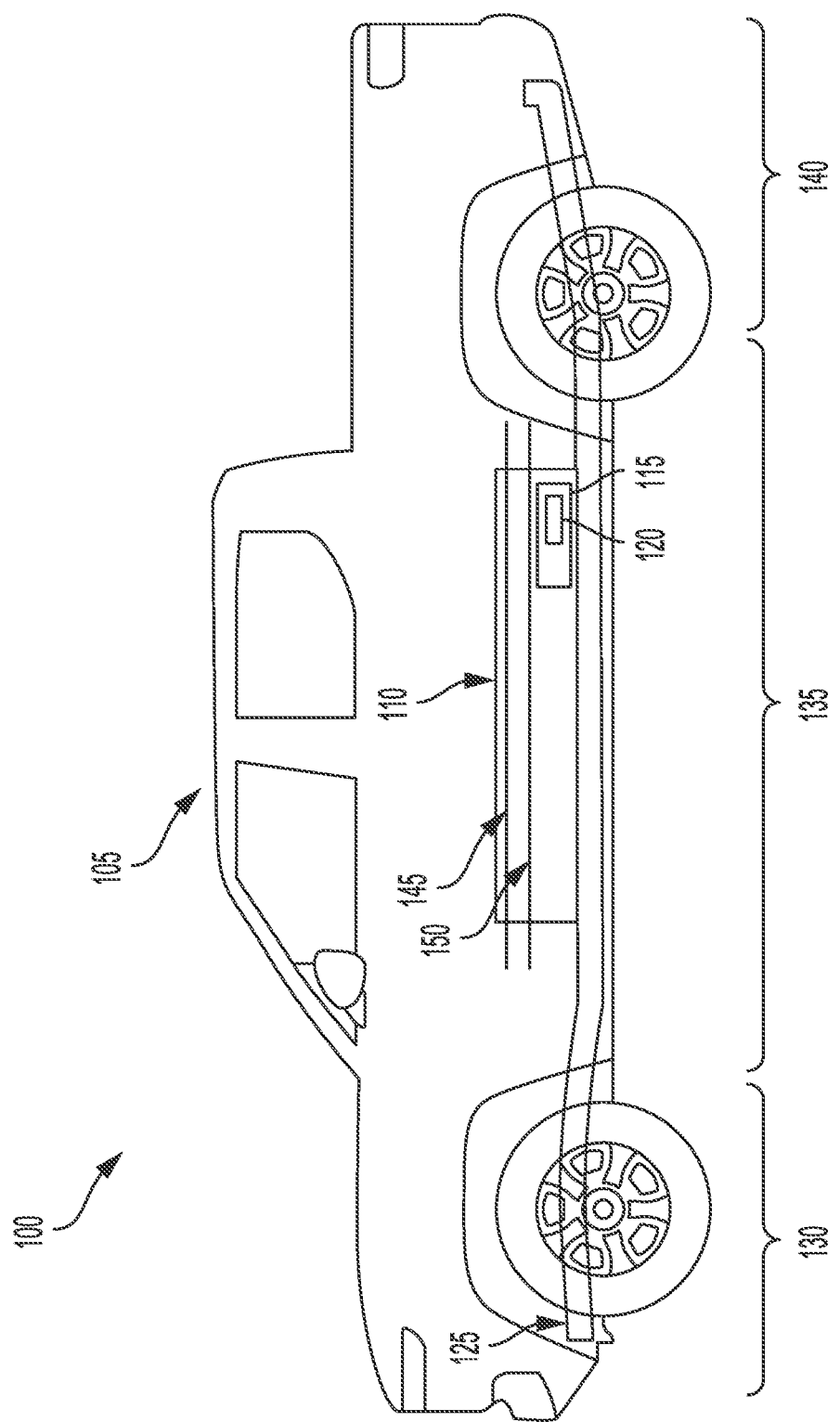
FIG. 1 depicts an example electric vehicle.

Following below are more detailed descriptions of various concepts related to, and implementations of, methods, apparatuses, and systems of continuously improving battery management models in a vehicle, such as an electric vehicle. The various concepts introduced above and discussed in greater detail below may be implemented in any of numerous ways.

The present disclosure is directed to systems and methods of improving machine learning ("ML") models in electric vehicles. For example, a model trained on historical data can predict values to within a tolerance range of the measured values for commonly occurring events that are captured by historical data, while being unable to do so when faced with rare conditions or circumstances on which the model is not sufficiently trained. In such instances, predicted values of a vehicle characteristic can deviate from the measured values of the same characteristic by more than a tolerance amount or a range. For example, a model can be trained to predict values of a characteristic associated with a Battery Management System ("BMS"), such as for example a state of charge of the battery, rate of energy or power consumption of the battery or temperature of a battery cell. The model may accurately forecast or predict these characteristic values when the vehicle is driving in well-known conditions (e.g., cruise control on a flat highway). However, the reliability of the forecasted characteristic values by the model may not align with the measured values within the tolerance range in rare or otherwise less-known conditions, such as for example when the vehicle is off-roading and the characteristics, such as energy or power consumed, can greatly increase. Therefore, improving the model to more accurately predict the characteristic, such as by adjusting the forecast range (e.g., bandwidth) of the model based on the characteristic or state of the vehicle, can help improve the overall model performance.

The ML model presented herein can be retrained using the vehicle data corresponding to the prediction that deviates from the observation as well as other related observed measurements or data. However, due to the large amount of data collected by the vehicle it can be challenging to transfer all the data from the vehicle to a server without introducing network delays, latency, or consuming excessive computing and energy resources. To address these technical problems, the technical solutions discussed herein can detect specific events or time intervals in which predictions from the model deviate from the measured observation beyond the tolerance and then identify and compile a corresponding subset of the vehicle data to retrain and improve the model. The compiled subset of vehicle data can include vehicle state data that can include relevant model data and vehicle data and measurements corresponding or relating to the event in which predictions deviated from the measured or observed values. By providing the subset of the vehicle data to the server, as opposed to all the data collected by the vehicle, the remote server can update or improve the model without introducing delays in the network or otherwise consuming excessive computational resources. The remote server can then utilize the received vehicle state data to train an updated version of the vehicle model via machine learning and then provide the new model to the vehicle fleet.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2A:
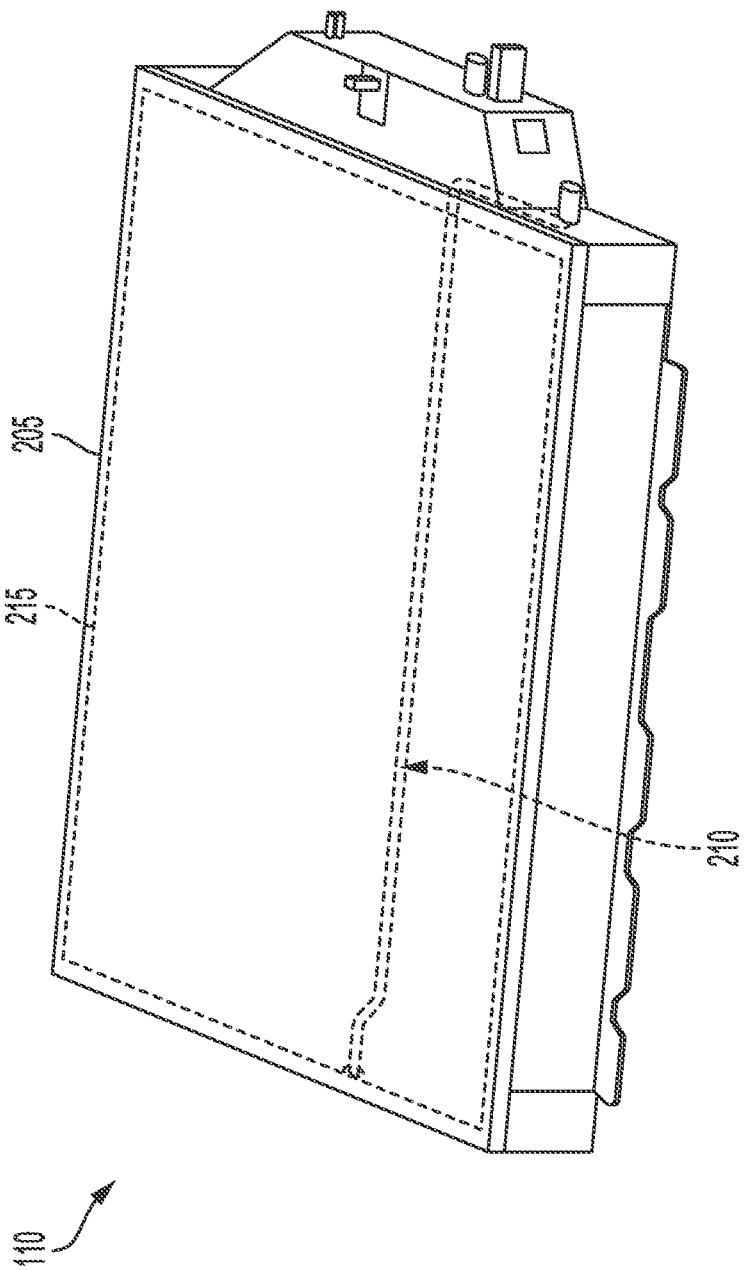
FIG. 2A depicts an example of one or more battery packs.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom and/or underneath the battery module 115 to protect the battery module 115 from external conditions, particularly if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one cold plate 215. In some instances, the cold plate 215 may be positioned in relation to a top submodule and a bottom submodule, such as in between the top and bottom submodules, among other possibilities. The battery pack 110 can include any number of cold plates 215. For example, there can be one or more cold plates per battery pack 110, or per battery module 115. The cooling line 210 can be coupled with, part of, or independent from the cold plate 215.

Figure 2B:
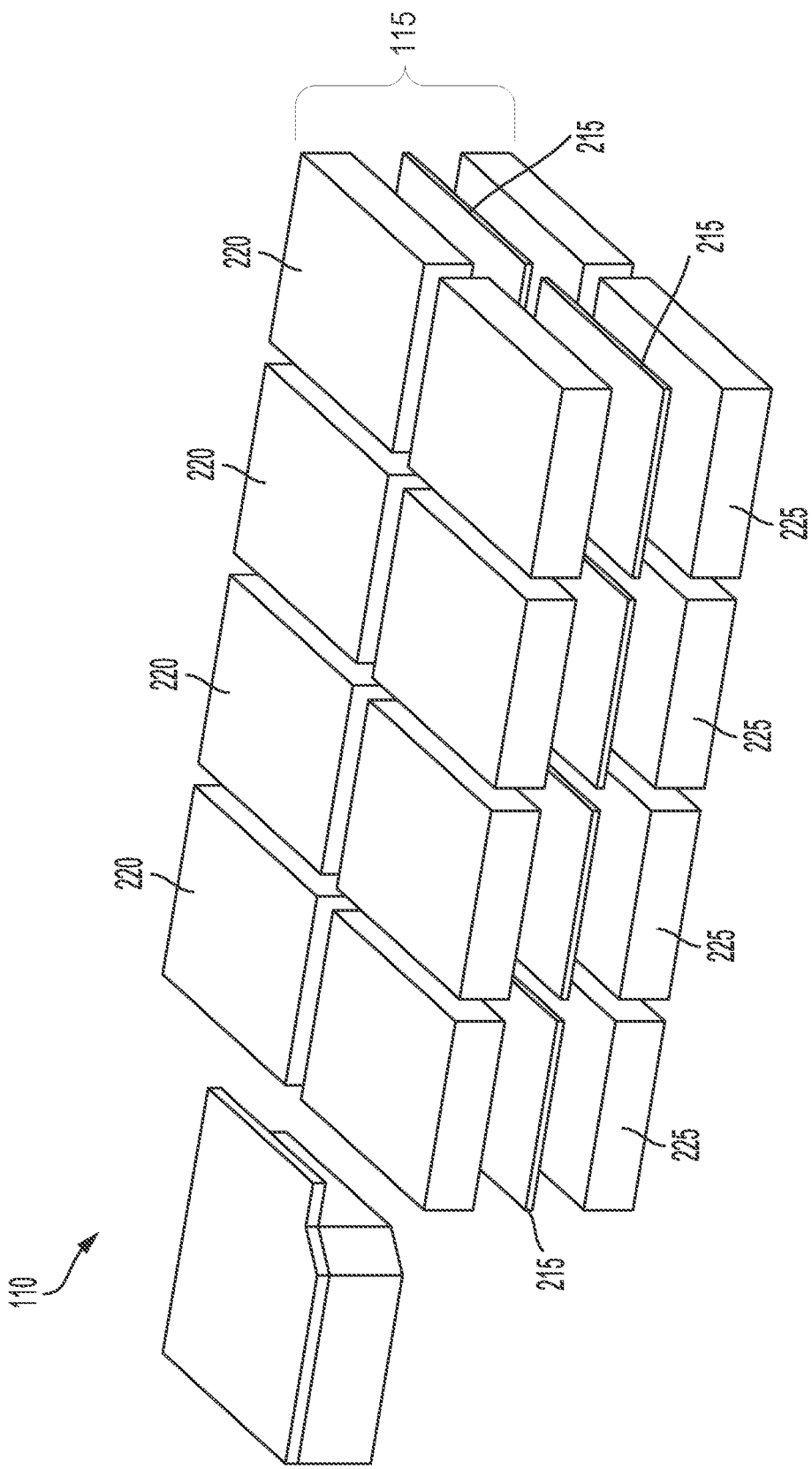
FIG. 2B depicts an example of one or more battery modules.
Figure 2C:
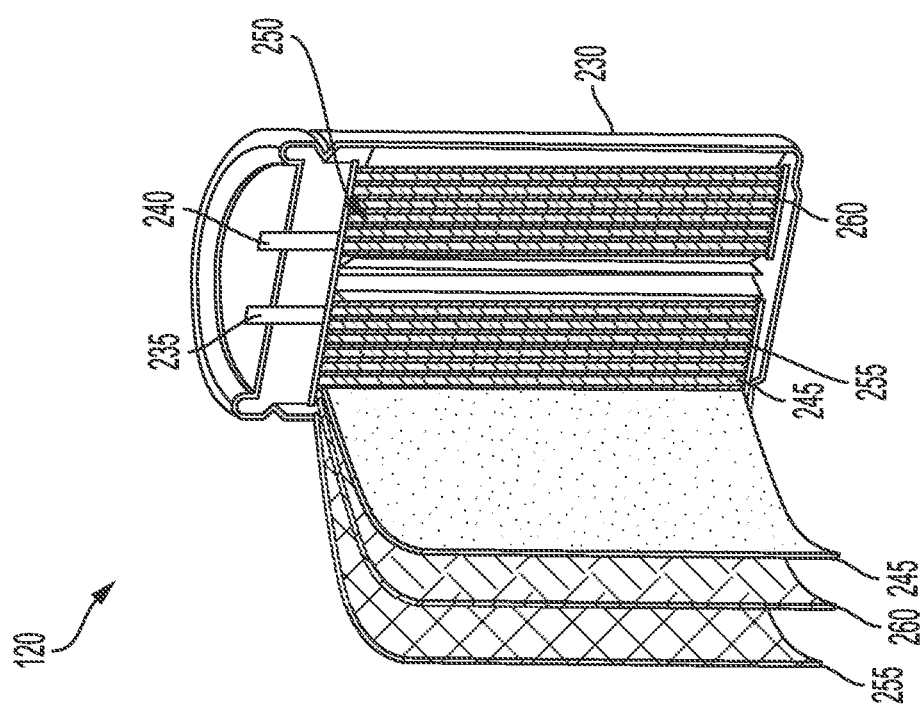
FIG. 2C depicts a cross sectional view of an example of a battery cell.

FIG. 2B depicts example battery modules 115, and FIG. 2C depicts an example cross sectional view of a battery cell 120. The battery modules 115 can include at least one submodule. For example, the battery modules 115 can include at least one top submodule 220 or at least one bottom submodule 225. At least one cold plate 215 can be disposed between the top submodule 220 and the bottom submodule 225. For example, one cold plate 215 can be configured for heat exchange with one battery module 115. The cold plate 215 can be disposed or thermally coupled between the top submodule 220 and the bottom submodule 225. One cold plate 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a cold plate 215 in between the top submodule 220 and the bottom submodule 225. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can generate or provide electric power for the battery cell 120. A first portion of the electrolyte material can have a first polarity, and a second portion of the electrolyte material can have a second polarity. The housing 230 can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted), elliptical, or ovular base, among others. The shape of the housing 230 can also be prismatic with a polygonal base, such as a triangle, a square, a rectangle, a pentagon, and a hexagon, among others.

The housing 230 of the battery cell 120 can include one or more materials with various electrical conductivity or thermal conductivity, or a combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others.

The battery cell 120 can include at least one anode layer 245, which can be disposed within the cavity 250 defined by the housing 230. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural Graphite, or blended), lithium titanate ($Li_4Ti_5O_{12}$), or a silicon-based material (e.g., silicon metal, oxide, carbide, pre-lithiated).

The battery cell 120 can include at least one cathode layer 255 (e.g., a composite cathode layer compound cathode layer, a compound cathode, a composite cathode, or a cathode). The cathode layer 255 can be disposed within the cavity 250. The cathode layer 255 can output electrical current out from the battery cell 120 and can receive electrons during the discharging of the battery cell 120. The cathode layer 255 can also release lithium ions during the discharging of the battery cell 120. Conversely, the cathode layer 255 can receive electrical current into the battery cell 120 and can output electrons during the charging of the battery cell 120. The cathode layer 255 can receive lithium ions during the charging of the battery cell 120.

The battery cell 105 can include an electrolyte layer 260 disposed within the cavity 250. The electrolyte layer 260 can be arranged between the anode layer 245 and the cathode layer 255 to separate the anode layer 245 and the cathode layer 255. The electrolyte layer 260 can transfer ions between the anode layer 245 and the cathode layer 255. The electrolyte layer 260 can transfer cations from the anode layer 245 to the cathode layer 255 during the operation of the battery cell 120. The electrolyte layer 260 can transfer anions (e.g., lithium ions) from the cathode layer 255 to the anode layer 245 during the operation of the battery cell 120.

The electrolyte layer 260 can include or be made of a liquid electrolyte material. The liquid electrolyte material can include a lithium salt dissolved in a solvent. The lithium salt for the liquid electrolyte material for the electrolyte layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. The electrolyte layer 260 can include or be made of a solid electrolyte material, such as a ceramic electrolyte material, polymer electrolyte material, or a glassy electrolyte material, or among others, or any combination thereof. The ceramic electrolyte material for the electrolyte layer 260 can include, for example, lithium phosphorous oxy-nitride ($Li_xPO_yN_z$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), among others. The polymer electrolyte material (e.g., a hybrid or pseudo-solid state electrolyte) for electrolyte layer 260 can include, for example, polyacrylonitrile (PAN), polyethylene oxide (PEO), polymethyl-methacrylate (PMMA), and polyvinylidene fluoride (PVDF), among others. The glassy electrolyte material for the electrolyte layer 260 can include, for example, lithium sulfide-phosphor pentasulfide ($Li_2S$—$P_2S_5$), lithium sulfide-boron sulfide ($Li_2S$—$B_2S_3$), and Tin sulfide-phosphor pentasulfide ($SnS$—$P_2S_5$), among others.

Figure 3:
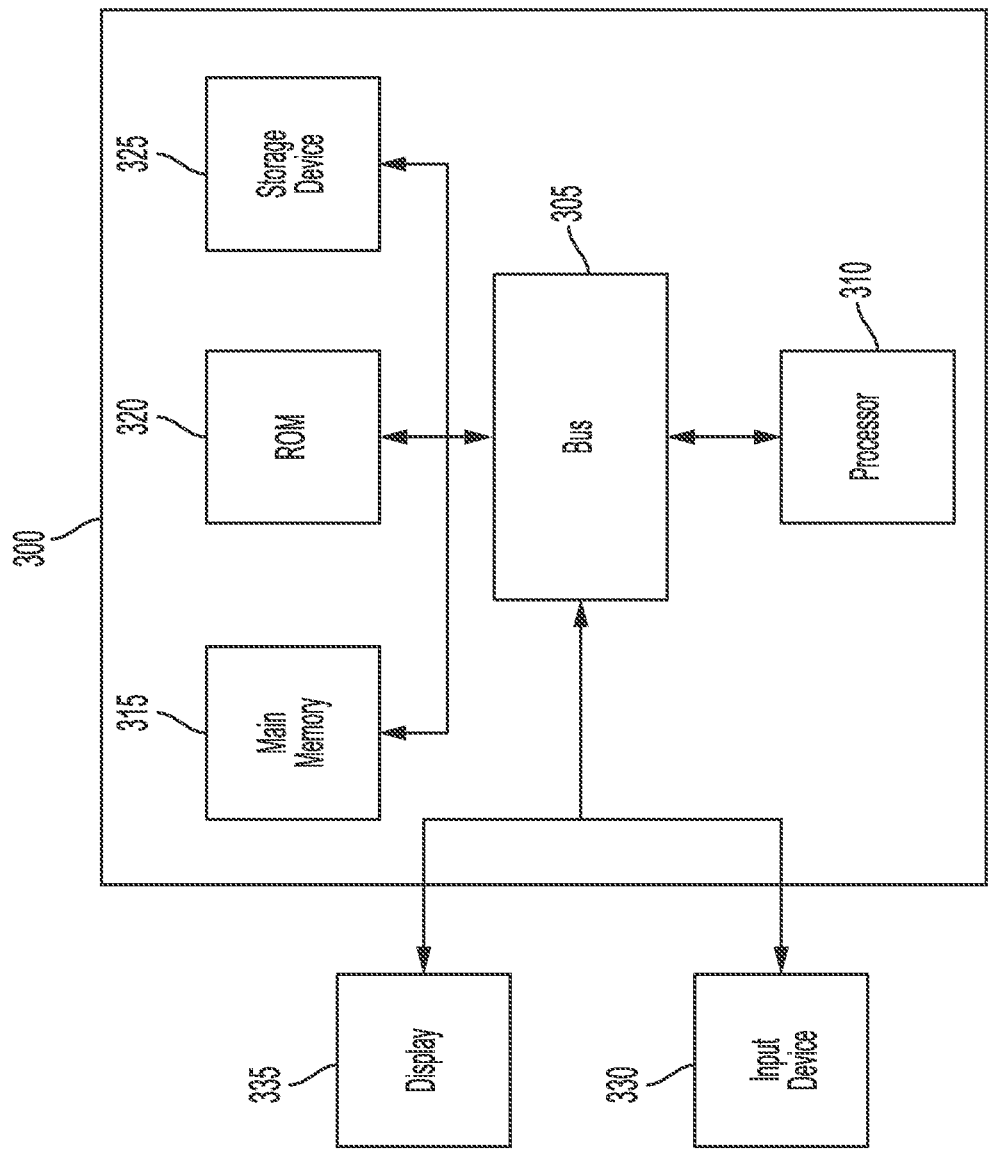
FIG. 3 is a block diagram illustrating an example architecture for a computer system that can be employed to implement elements of the systems and methods described and illustrated herein.

FIG. 3 depicts an example block diagram of an example computer system 300. The computer system or computing device 300 can include or be used to implement a data processing system or its components. The computing system 300 includes at least one bus 305 or other communication component for communicating information and at least one processor 310 or processing circuit coupled to the bus 305 for processing information. The computing system 300 can also include one or more processors 310 or processing circuits coupled to the bus for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 may be coupled via the bus 305 to a display 335, such as a liquid crystal display, or active matrix display, for displaying information to a user such as a driver of the electric vehicle 105 or other end user. An input device 330, such as a keyboard or voice interface may be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
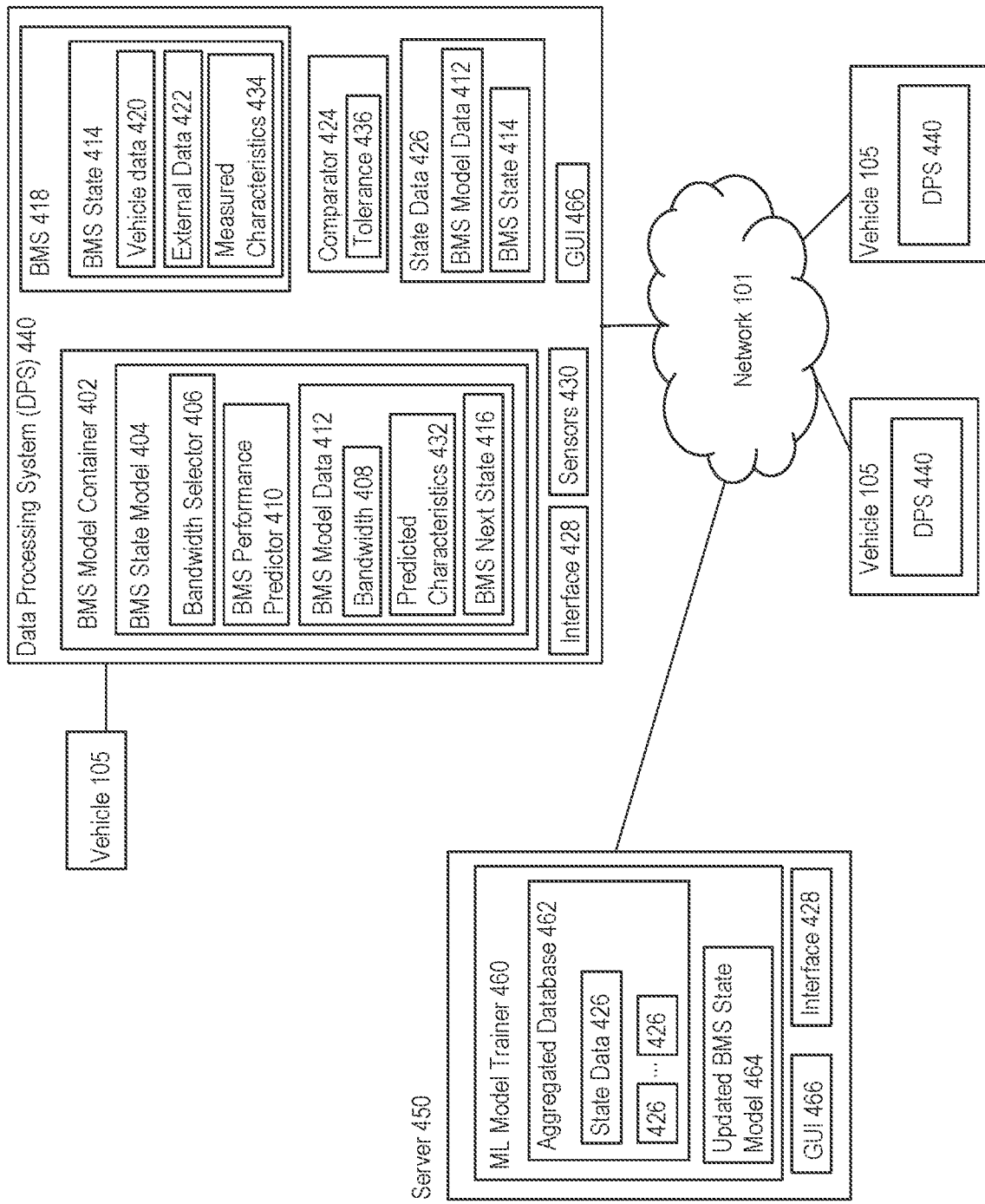
FIG. 4 is a block diagram illustrating an example of a system 400 for operating and improving a model for monitoring and predicting operation, where the model can be improved by a remote server.

FIG. 4 illustrates an example system 400 in which one or more vehicles 105 communicate to one or more servers 450 via one or more networks 101. Vehicle 105 can include one or more data processing systems (DPS) 440. DPS 440 can include one or more BMS model containers 402. DPS 440 can include one or more battery management systems (BMS) 418. DPS 440 can include one or more comparators 424. DPS 440 can include one or more state data 426. DPS 440 can include one or more interfaces 428. DPS 440 can include one or more sensors 430. DPS 440 can include one or more graphical user interfaces (GUIs) 466. A BMS model container 402 can provide an operating environment for one or more BMS state models 404. BMS state model 404 can include one or more bandwidth selectors 406, one or more BMS performance predictors 410 and one or more BMS model data 412. BMS model data 412 can include one or more bandwidths 408, one or more predicted characteristics 432 and one or more BMS next states 416. BMS 418 can include one or more BMS states 414 that can include one or more vehicle data 420, one or more external data 422 and one or more measured characteristics 434. State data 426 can include one or more BMS model data 412 and one or more BMS states 414. A comparator 424 can include one or more tolerances 436. Across the network 101, one or more servers 450 can each include one or more ML model trainers 460 that can include one or more aggregated databases 462 that can include any number of state data 426 from any number of vehicles 105 across the network 101. An ML model trainer 460 can include and one or more updated BMS state models 462 that can be trained and used to replace or update BMS state models 404 on vehicles 105. Server 450 can also include one or more interfaces 428 for exchanging communication with DPSs 440 of the fleet of vehicles 105 over one or more networks 101 and one or more GUIs 466 for presenting or displaying results.

Network 101 can include any type and form of network and networking protocols. Network 101 can include devices and systems to provide interconnection between components of the system 400, such as between servers 450 and vehicles 105. Network 101 can include personal area networks (PAN), local area networks (LAN), Wireless LAN, campus area networks (CAN), metropolitan area networks (MAN), wide area networks (WAN), storage area networks (SAN), the Internet, a point-to-point network, a broadcast network, a wireless network, a wireline network, a computer network, a data communication network and others. Possible network architectures include bus, star, ring, mesh, tree, fully connected, and many others. Network 101 can include a virtual network, such as an overlay network. Network 101 can include a virtual private network (VPN). Network 101 can include use any of a variety of communication protocols and protocol stacks. The protocols may be connection-oriented or connectionless. The protocols may use circuit mode, packet switching or other methods. The protocols may use hierarchical addressing or flat addressing or other methods. Example protocols can include IEEE 802, TCP/IP, SONET/SDH, Asynchronous Transfer Mode (ATM), advanced mobile phone protocol (AMPS), time division multiple access (TDMA), code-division multiple access (CDMA), global system for mobile communication (GSM), and others. Different types of data may be transmitted via different protocols, or the same types of data may be transmitted via different protocols.

System 400 can include any combination of vehicles 105 with DPSs 440 and BMS state model 404 that can communicate with one or more servers 450 over a network 101. System 400 can include for example a fleet of vehicles 105, where each vehicle 105 utilizes own DPS 440 to communicate via a network 101 with one or more servers 450. Communications in system 400 can include transmission of information or data, such as state data 426, from a DPS 440, across a network 101, to a server 450. Communications in system 400 can include any information or data transmitted from a server 450 to vehicles 105, including for example an updated BMS state model 464, trained by a ML model trainer 460 to replace the BMS state model 404 on one or more vehicles 105. System 400 can include any operations of one or more DPSs 440 or one or more servers 450 discussed herein.

Data processing system (DPS) 440 can include any combination of hardware and software, such as processors, circuits and memory comprising or executing computer programming code, functions and scripts for processing and communicating information. DPS 440 can include any functionality of a computing system 300. DPS 440 can include functionality to predict or forecast characteristics and establish or determine predicted characteristics 432. DPS 440 can include functionality to measure characteristics and establish or determine measured characteristics 434. DPS 440 can include functionality for comparing the forecasted or predicted characteristics 432 with the measured characteristics 434, to determine if their difference is within a tolerance 436 threshold or range. DPS 440 can include functionality for gathering or compiling state data 426 corresponding to an event, or the time interval of the event, during which predicted characteristics 432 and measured characteristics 434 did not match within the tolerance 436.

For example, DPS 440 can include a processor coupled to a memory. DPS 440 can predict a first value for a characteristic (e.g., a predicted characteristic 432) of the vehicle 105 based at least on, or using, a model (e.g., a BMS state model 404). DPS 440 can measure a second value (e.g., measured characteristic 434) for the same characteristic of the vehicle 105. The second value can be measured based at least on, or using, one or more sensors 430 of the vehicle 105, determined by vehicle systems or tools or received via external data 422. DPS 440 can determine a difference between the first value (e.g., predicted characteristic 432) and the second value (e.g., measured characteristic 434) using one or more sensors 430. The difference can be determined using comparator 424. DPS 440 can determine that the difference between the first value and the second value is greater than a tolerance 436. DPS 440 can identify a state of the vehicle 105 (e.g. state data 426). The state of the vehicle can be associated with the difference between the first value and the second value. The state of the vehicle can correspond to, or be associated with, at least one of the first value or the second value. The state of the vehicle (e.g. state data 426) can include a subset of vehicle BMS model data 412 and a subset of BMS state 414 that can correspond to the time interval within which the first value and the second value were determined. In response to the difference between the first and second value exceeding the tolerance (e.g., tolerance 436) the DPS 440 can provide or communicate the state of the vehicle (e.g., state data 426) to one or more servers 450 that can be remote from the vehicle 105 to update the BMS state model 404.

DPS 440 can predict the first value for the characteristic (e.g. predicted characteristic 432) of a battery (e.g., a battery pack 110) of the vehicle 105 using the model (e.g., BMS state model 404). The model can be trained via machine learning (e.g. ML model trainer 460). The model can be operated by, or corresponding to, a battery management system (e.g., BMS 418) of the vehicle. The characteristic (e.g., predicted characteristic 432) can correspond, for example, to at least one of temperature, current, voltage or power of the battery (e.g., battery pack 110). DPS 440 can measure the second value (e.g., measured characteristic 434) for the characteristic of the battery (e.g., battery pack 110). The second value for the characteristic (e.g., measured characteristic 434) of the battery can also correspond to the one of temperature, current, voltage or power of the battery. DPS 440 can identify the state of the vehicle (e.g., state data 426) associated with the first value (e.g., predicted characteristic 432) and the second value (e.g., measured characteristic 434). DPS 440 can determine a forecast range (e.g., bandwidth 408) for the first value based at least on a type of the characteristic (e.g. predicted characteristic 432) of a battery (e.g., battery pack 110) of the vehicle 105. DPS 440 can predict the first value for the characteristic (e.g., predicted characteristic 432) of the battery (e.g., battery pack 110) of the vehicle 105 based on the forecast range. DPS 440 can measure the second value for the characteristic (e.g., measured characteristic 434) at a time based at least on the forecast range (e.g., bandwidth 408).

DPS 440 can identify the state of the vehicle (e.g. state data 426) associated with the first value (e.g., predicted characteristic 432) based on one or more of: operation mode, thrust, energy consumption, torque, acceleration, distance traveled, vibration, weight, local weather data, global positioning system ("GPS") data, trip data, humidity, air pressure, and temperature. DPS 440 can identify the state of the vehicle (e.g. state data 426) associated with the second value based on one or more of: operation mode, thrust, energy consumption, torque, acceleration, distance traveled, vibration, weight, local weather data, global positioning system ("GPS") data, trip data, humidity, air pressure, and temperature. DPS 440 can predict the first value for the characteristic (e.g., predicted characteristic 432) of the battery (e.g., battery pack 110) of the vehicle 105 using the model trained via machine learning (e.g., trained by ML model trainer 460). DPS 440 can identify the type of characteristic corresponding to one of a drive mode of the vehicle, state of a battery or driving conditions of vehicle. Drive mode of the vehicle can include an all-purpose drive mode, energy conserve mode, off-road mode, sport mode and towing mode. State of a battery can include a temperature, energy or power consumption or energy or power level of a battery pack 110, battery module 115 or battery cell 120. Driving conditions can include off-road conditions, highway conditions, hilly or mountainous conditions, icy or wet conditions, or conditions in environment in which temperature is above a predetermined threshold.

DPS 440 can determine a second difference between a third value for a characteristic (e.g., another value for the predicted characteristic 432) of the vehicle 105 predicted using the model (e.g., BMS state model 404) trained via machine learning (e.g., ML model trainer 460) and a fourth value for the characteristic (e.g., another value for the measured characteristic 434) of the vehicle 105 measured using the sensor (e.g., sensors 430). DPS 440 can determine (e.g., via comparator 424) that the difference between the third value and the fourth value is not greater than the tolerance (e.g., tolerance 436). DPS 440 can determine to not provide the state of the vehicle (e.g., state data 426) to the server (e.g., server 450) in response to the difference (e.g., difference between the third value and fourth value) not exceeding the tolerance (e.g., tolerance 436).

DPS 440 can predict the first value (e.g., predicted characteristic 432) after a first time interval (e.g., bandwidth 408). DPS 440 can measure the second value (e.g., measured characteristic 434) after the first time interval. DPS 440 can identify the state of the vehicle 105 (e.g., state data 426) after the first time interval. DPS 440 can receive an updated model (e.g., BMS state model 404) from the server (e.g., server 450) and predict a third value (e.g., another instance of the predicted characteristic 432) for the characteristic of the vehicle 105 using the updated model (e.g., BMS state model 404). DPS 440 can determine the difference (e.g., via comparator 424) between the third value (e.g., 432) and a fourth value (e.g., 434). The fourth value can be measured using a sensor 430 or can be provided by BMS 418 via any BMS state 414 data. DPS 440 can determine that the difference (e.g., between the 432 value and 434 value) is less than the tolerance (e.g., tolerance 436).

DPS 440 can transmit the state of the vehicle (e.g., state data 426) to the remote server (e.g., server 450) in response to a determination that network bandwidth or communication resources for a communication between vehicle 105 and server 450 are below a threshold. DPS 440 can use interface 428 to determine that the network bandwidth is below the threshold. DPS 440 can identify a forecast range (e.g. bandwidth 408) for predicting the characteristic (e.g., predicted characteristic 432). DPS 440 can predict the first value for the characteristic (e.g., predicted characteristic 432) at a timestamp set based on the forecast range (e.g., bandwidth 408). DPS 440 can measure the second value for the characteristic (e.g., measured characteristic 434) at the timestamp (e.g., at the time for which the first value was predicted). DPS 440 can provide, in response to the difference (e.g., between the first value and second value) exceeding the tolerance (e.g., tolerance 436), the state of the vehicle (e.g., state data 426) to the server (e.g. server 450) to update the forecast range (e.g., bandwidth 408) for predicting the characteristic.

BMS model container 402 can include any combination of hardware and software, including scripts and computer code stored in memory or operating on a processor that can provide a separated and isolated operating environment for BMS state model 404. BMS model container 402 can include a software container to package the code of the BMS state model 404 along with the resources or files that used by the BMS state model 404. BMS model container 402 can package or contain all dependencies of the BMS state model 404 so that the BMS state model 404 can run within the BMS model container 402 independent of the surrounding environment or platform on which it can operate. BMS model container 402 can include standalone software functions, scripts and code that can include code, runtime, system tools, libraries and settings for the BSM state model 404. BMS model container 402 can include executable package of software that can bundle the bandwidth selector 406 and BMS performance predictor 410 along with all of the related configuration files used by any part of the BMS state model 404 to operate within the BMS model container 402. BMS model container 402 can include functionality for the BMS state model 404 to operate and run entirely within BMS model container 402.

BMS model container 402 can include an open source container orchestration system for automating software deployment, scaling and management. BMS model container 402 can host any number of applications using containerization technology, including for example, a platform as a service product that uses operating system level virtualization to provide containers for software applications, such as for example BMS state models 404.

BMS state model 404 can include any combination of hardware and software, such as scripts, functions and computer code stored in memory or operating on a processor for modeling operation, state or condition of a vehicle 105. BMS state model 404 can operate inside a BMS model container 402. BMS state model 404 can operate outside of a BMS model container 402, or independent from any BMS model container 402. BMS state model 404 can include functionality for modeling operation, state or condition of any systems or components of a vehicle 105, including for example a battery system, such as a battery pack 110. BMS state model 404 can include functionality or programming code for modeling operation of a vehicle 105 or its systems and components. BMS state model 404 can include one or more model functions for determining or predicting operation of a vehicle 105 or its system or components, over a time interval, such as for example a time interval corresponding to, or determined based on, the bandwidth 408 (e.g., a forecast range). BMS state model 404 can include a model for determining or predicting operation of a battery of the vehicle 105. BMS state model 404 can include a model corresponding to one or more of a battery pack 110, a battery module 115 or a battery cell 120 of a vehicle 105. BMS state model 404 can include a model for determining or predicting a time interval or forecast range (e.g., bandwidth 408) over which performance of the vehicle (e.g., BMS model data 412) is to be predicted. BMS state model 404 can model or determine one or more of a temperature, current, voltage, power, energy, energy storage capacity, force, torque, vibration, battery health, battery charge level, or any other characteristics of a vehicle 105 discussed herein. BMS state model 404 can model or determine operation mode, thrust, energy consumption, acceleration, distance traveled, incline or slope or vibration of the vehicle 105.

BMS state model 404 can, individually or along with DPS 440, continuously and cyclically receive observed data (e.g., BMS state 414), recalculate or determine predicted data (e.g., BMS model data 412), and compare predicted characteristics (e.g., 432) against corresponding observed or measured characteristics (e.g., 434). DPS 440 and BMS state model 404 can implement each cycle periodically, such as every microsecond, 100 microseconds, every millisecond, 10 milliseconds, 100 milliseconds, 500 milliseconds, 1 second, 5 seconds or similar. DPS 440 and BMS state model 404 can implement each cycle based on an event, such as, for example starting a new cycle when a prior cycle is completed. DPS 440 and BMS state model 404 can implement a cycle in response to determining that an amount of available resources that DPS 440 utilizes is above a threshold.

BMS state model 404 can utilize indices and weights for determining BMS model data 412. Weights can include parameters for weighing inputs for functions, such as bandwidth selector 406 or BMS performance indicator 410. Indices can include list of data, a group of files or database entries that can be used by the BMS state model 404. BMS state model 404 can utilize weights or indices for weighing, multiplying, dividing or offsetting parameters used by the BMS state model 404, including for example bandwidth selector 406 to determine bandwidth 408 or BMS performance indicator 410 for determining predicted characteristics 432 or BMS next state 416.

BMS model data 412 can include any data or information included in or corresponding to a BMS state model 404. BMS model data 412 can include one or more outputs from the BMS state model 404. BMS model data 412 can include data or information determined or processed by BMS state model 404. BMS model data 412 can include a database or a data structure operating on a memory or a storage device to store information. BMS model data 412 can include data corresponding to vehicle 105 operation or performance. BMS model data 412 can include data corresponding to the state or operation of various systems and subsystems in a vehicle 105, including for example battery (e.g. battery pack 110, battery module 115, battery cells 120) charge port, DC/DC converter, electric traction motor, onboard charger, power electronics controller, thermal system (e.g. cooling system), transmission of the vehicle 105 or any other part of a vehicle 105. BMS model data can include information or data corresponding to operation mode, thrust, current, voltage, power, energy, including energy consumption, torque, velocity, acceleration, distance traveled, vibration, weight, local weather data, global positioning system ("GPS") data, trip data, humidity, air pressure, and temperature.

Bandwidth 408 can include or correspond to a time interval or a forecast range for which BMS state model 404 can predict or determine operation, data or state of vehicle 105. Bandwidth 408 can include or correspond to a time interval or a forecast range for predicting a predicted characteristic 432 or BMS next state 416. Bandwidth 408 can include forecast range or a time interval that is the same for multiple predicted characteristics 432. Bandwidth 408 can include a forecast range or a time interval that is changed or modified for different characteristics. Bandwidth 408 can be dynamic and be modified for the same characteristic, such that a predicted characteristic 432 is determined a first time (e.g., a first cycle) at a first forecast range and the same predicted characteristic 432 is determined a second time (e.g., a second cycle) at a different forecast range. Bandwidth 408 can be set up to be different for different characteristics, such that a predicted characteristic 432 of a first type (e.g., a battery temperature) is determined at a first forecast range and a predicted characteristic 432 of a second type (e.g., driving conditions of a vehicle) 432 is determined at a different forecast range. Bandwidth 408 can include one or more outputs from the BMS state model 404.

Bandwidth 408 can change periodically or based on events. Bandwidth 408 can set or determined by a BMS state model 404. Bandwidth 408 can be determined by ML model trainer 460 on a server 450. Bandwidth 408 can include any time interval over which a determination will be made by the BMS state model 404 into the future. For example, bandwidth 408 can include a time interval of between 1 second and 1 minute, such as up to 1 second, 5 seconds, 10 seconds, 15 seconds, 20 seconds, 30 seconds, 45 seconds, 50 seconds and 1 minute. Bandwidth 408 can include a time interval of between 1 minute and 1 hour, such as up to 1 minute, 2 minutes, 4 minutes, 5 minutes, 7 minutes, 10 minutes, 12 minutes, 15 minutes, 20 minutes, 30 minutes, 40 minutes, 50 minutes and one hour. Bandwidth 408 can include a time interval of between 1 hour and 24 hours, such as 1 hour, 1.1 hour, 1.5 hours, 1.8 hours, 2 hours, 2.5 hours, 3 hours. 3.5 hours, 4 hours, 4.5 hours, 5 hours, 6 hours, 7 hours, 8 hours, 10 hours, 12 hours, 15 hours, 18 hours, 20 hours and 24 hours. Bandwidth 408 can include a time interval that is greater than 24 hours, such as 1.5 days, 3 days, 7 days and more.

Bandwidth 408 can be set or modified for a characteristic based on BMS state 414. Bandwidth 408 can be set or modified based on vehicle data 420, external data 422 or measured characteristics 434. Bandwidth 408 can be set or modified, based on BMS state 414 providing the current drive model, battery health and terrain. Bandwidth 408 can be set or modified based on BMS state 414 data corresponding to the temperature, energy or power consumption, energy or power state, vehicle location, vehicle temperature, outside weather or any other data in BMS state 414.

Characteristics of a vehicle 105, whether predicted characteristic 432 or measured characteristic 434, can include any characteristic of a vehicle 105 that can be predicted or forecasted some time interval in the future (e.g., forecast range of bandwidth 408). Characteristics (e.g., 432 or 434) can be predicted by a BMS state model 404. Characteristics (e.g., 432 or 434) can be a feature or of a characteristic of a vehicle 105 that is predicted over a time interval or forecast range defined or corresponding to the bandwidth 408. For example predicted characteristic 432 can include a characteristic of a battery, such as a battery pack 110, battery module 115 or battery cell 120. Characteristics (e.g., 432 or 434) can include a characteristic of an electric motor of a vehicle 105 or a thermal system for cooling the vehicle 105. Characteristics (e.g., 432 or 434) can include a characteristic of a power electronics controller of a vehicle 105. Characteristics (e.g., 432 or 434) can include a characteristic of an onboard charger of a vehicle 105. Characteristics (e.g., 432 or 434) can be, include or correspond to any one or more of current, voltage, power, energy, operation mode, thrust, energy or power consumption or usage, torque, velocity, acceleration, distance traveled, vibration, weight, local weather data, global positioning system ("GPS") data, trip data, humidity, air pressure, temperature, battery health, drive model, drive mode, vehicle road or terrain information or data or any other information or data discussed herein. Characteristics (e.g., 432 or 434) can be measured by a sensor 430, or received from BMS 418, included in any portion of BMS state 414, including for example vehicle data 420 or external data 422. Characteristics predicted or measured (e.g., 432 or 434) can include one or more outputs from the BMS state model 404.

Characteristics predicted (or measured) can include different types. For example, a predicted characteristic 432 (as well as a measured characteristic 434) can include a type of a characteristic corresponding to a drive mode of the vehicle. The drive mode characteristic can include an electric vehicle drive mode, a snow conditions drive mode, an off-road conditions drive mode, an eco-drive mode, such as for example in hybrid vehicles that utilize a motor engine and an electric engine, or any other drive mode used by a vehicle 105. A characteristic, including 432 and 434 characteristics, can include a type of a characteristic corresponding to a state of a battery, such as battery pack 110, battery module 115 or battery cell 120. The state of a battery characteristic can include a temperature of a battery, energy level stored at the battery, energy consumption of the battery, power output of the battery, current or voltage outputs of the battery and surrounding environment temperature of the battery. A characteristic, including 432 and 434 characteristics, can include a type of characteristic corresponding to driving conditions of a vehicle 105. The driving conditions characteristics can include a location of a vehicle 105, such as a GPS location on which vehicle 105 is travelling. Driving condition characteristics can include a type of terrain on which the vehicle 105 is located, such as mountainous terrain, a field, an off-road terrain or a path, a city street, a highway, a hilly region, a beach or a desert. Driving condition characteristics can include weather conditions, such as the environment temperature, presence or absence of snow or ice, humidity, fog, air pressure and wind speed and direction. Driving condition characteristics can include vibration sensor signals or data, slope or incline data, elevation signal or data, torque data or any other type of data that can correspond or relate to conditions in which vehicle 105 is being driven.

BMS next state 416 can include a predicted state of a vehicle 105 at a set point in the future. BMS next state 416 can include a state of the vehicle 105 at a time interval into the future corresponding to or determined based on bandwidth 408. BMS next state 416 can include the state of the vehicle 105 at a bandwidth 408 point that is, for example, 5 minutes, 10 minutes, 20 minutes or any other time interval into the future. BMS next state 416 can include a predicted state of a battery, such as a battery pack 110, battery module 115 or battery cell 120. BMS next state 416 can include a predicted state of any other part of vehicle 105, such as a charge port, DC/DC converter, electric traction motor, onboard charger, power electronics components, thermal system (e.g. cooling system), a transmission or any other part of vehicle 105. BMS next state 416 can include one or more outputs from the BMS state model 404.

Bandwidth selector 406 can include any combination of hardware and software, including scripts, functions and computer code stored in memory or operating on a processor for determining or selecting a bandwidth 408. Bandwidth selector 406 can select a bandwidth 408 based on the type of the characteristic 432 being predicted. Bandwidth selector 406 can determine a bandwidth 408 based on a table in which different time intervals are assigned for different characteristics of the vehicle 105 to be determined by BMS state model 404. For example, bandwidth selector 406 can select or determine a bandwidth 408 based on identifying that the characteristic being predicted includes temperature or an energy level of a battery pack 110 or a battery module 115 or a battery cell 120. Bandwidth selector 406 can select or determine a bandwidth based on vehicle data 420 or external data 422, such as for example vehicle 105 temperature or external environment temperature from a weather report. Bandwidth selector 406 can determine a bandwidth 408 based on a BMS model data 412.

Bandwidth selector 406 can determine a bandwidth based on one or more prior comparisons of one or more predicted characteristics 432 and measured characteristics 434. For example, one or more prior comparisons can be made in view of a tolerance 436. Bandwidth selector 406 can increase a bandwidth 408 (e.g. increase a time interval over which a particular characteristic 432 is to be predicted) when one or more prior comparisons (e.g. between the predicted characteristic 432 and measured characteristic 434 of the same type) are within a tolerance 436. Bandwidth selector 406 can decrease a bandwidth 408 (e.g. decrease a time interval over which a particular characteristic 432 is to be predicted) when one or more prior comparisons (e.g. between the predicted characteristic 432 and measured characteristic 434 of the same type) are outside of a tolerance 436. Bandwidth selector 406 can modify bandwidth 408 based on determinations pertaining to the vehicle 105, such as a drive model, battery health (e.g. state of health of a battery, such as battery pack 110) and terrain. For example, bandwidth selector 406 can determine a bandwidth 408 based on a determination that vehicle 105 is in an area in which terrain includes off-road and unpaved path, or is otherwise bumpy or demanding (e.g. mountainous, hilly, rocky or inclined).

BMS performance predictor 410 can include any combination of hardware and software, including scripts, functions and computer code stored in memory or operating on a processor for predicting performance of a vehicle 105. BMS performance predictor 410 can include functions for determining status of any portion of vehicle 105 at some time interval in the future. The time interval can be set by, or correspond to, the bandwidth 408. BMS performance predictor 410 can predict performance of a battery, including a battery pack 110, battery module 115 or battery cells 120. BMS performance predictor 410 can predict performance of any other part of a vehicle 105, such as a transmission, thermal system or an electric traction motor. BMS performance predictor 410 can include functionality for determining BMS next state 416. BMS performance predictor 410 can include functionality for determining predicted characteristics 432. BMS performance predictor 410 can apply weights to different parameters. For example, BMS performance predictor 410 can weigh temperature characteristic more than a current characteristic. For example, BMS performance predictor 410 can weight temperature of one battery cell 120 more than temperature of another battery cell 120. BMS performance predictor can determine performance of a vehicle 105 or its system based on weighted inputs or characteristics.

Battery management system (BMS) 418 can include any combination of hardware and software, including scripts, functions and computer code stored in memory or operating on a processor for monitoring and controlling power storage systems, assuring health of battery cells and delivering or distributing power to vehicle 105. BMS 418 can include firmware functions and can be implemented at a firmware level to facilitate a high fidelity of communication with onboard vehicle telemetry. BMS 418 can include functionality for regulating power from external charger to the battery pack 110 during a charging event. BMS can enable or disable one or more systems or circuitry to maintain stasis at vehicle level. During a driving event, BMS can direct power from battery pack 110 to the powertrain 505 of the vehicle 105. The drive inverter can communicate with BMS 418 to exchange state information and power draw requirements. BMS 418 can respond with a power increase or decrease into the powertrain circuitry, which can cause acceleration or deceleration of the vehicle 105. During a downhill drive, BMS 418 can direct power from drivetrain into the battery pack 110 via regenerative braking.

BMS 418 can include BMS state 414 which can include updated or real-time data describing the state of the vehicle 105. BMS state 414 can include any readings from sensors 430. BMS state 414 can include vehicle data 420, external data 422 or measured characteristics 434. As BMS 418 can operate at firmware level, BMS state 414 can be efficiently provided or utilized by the vehicle 105 via firmware level communications. Information and data provided by BMS 418, including BMS state 414, can be communicated to or monitored by a DPS 440, which can continuously check whether observed or measured values from the BMS 418 fall outside of an expected range (e.g. whether they are within tolerance 436 of predicted characteristics 432).

Vehicle data 420 can include any data or information corresponding to vehicle 105. Vehicle data 420 can include measurements from sensors 430 on the vehicle 105. Vehicle data 420 can include measurements or data corresponding to state or health of a battery (e.g. battery pack 110, battery module 115 or battery cell 120). Vehicle data 420 can include measurements or data corresponding to vehicle operation mode, thrust, current, voltage, power, energy, including energy consumption, torque, velocity, acceleration, distance traveled, vibration, weight, trip data, humidity, air pressure, and temperature. Vehicle data 420 can include or correspond to any characteristic, such as measured characteristic 434.

External data 422 can include any data or information external to the vehicle 105. External data 422 can include local weather data, including temperature, humidity, air pressure, wind speed and other weather data. External data 422 can include global positioning system ("GPS") data. External data 422 can include weather data along the intended trip to be made by vehicle 105. External data 422 can include data received from remote devices, such as servers 450 over a network 101.

Comparator 424 can include any combination of hardware and software, including scripts, functions and computer code stored in memory or operating on a processor for comparing predicted characteristics 432 with measured characteristic 434. Comparator 424 can include functionality to determine a difference between values a predicted characteristic 432 and a measured characteristic 434. The values of the predicted characteristic 432 and measured characteristic 434 can correspond to the same characteristic of the vehicle 105. Comparator 424 can include a time stamp for any predicted characteristic 432 so as to measure its corresponding measured characteristic 434 at the exact time. For example, if a predicted characteristic 432 is for a temperature of a battery cell 120 at a time interval in the future determined based on bandwidth 408, comparator 424 can use a time stamp for the time interval to measure the temperature for that battery cell 120 at the moment when that time interval is reached, has passed or is met. Comparator 424 can compare the predicted characteristic 432 with its measured characteristic 424 counterpart to determine their difference. Comparator 424 can determine if the difference between the predicted characteristic 432 and measured characteristic 424 is within tolerance 436 or outside of tolerance 436.

Tolerance 436 can include any tolerance range or a tolerance threshold. Tolerance 436 can include a range or a threshold determined in any units corresponding to the characteristic predicted or measured (e.g., 432 or 434). Tolerance 436 can include a range or a threshold in Celsius or Fahrenheit degrees for temperature, Joules for energy, Watts for power, Amperes for current, Volts for voltage, and any other unit that may correspond to a characteristic measured or predicted. Tolerance 436 can be set in terms of percentage of a predicted or measured value, such as for example, up to 5%, 10%, 15%, 20%, 30%, 40%, 50%, 60%, 70%, 80%, 90% or 100% of the predicted characteristic 432 or measured characteristic 434.

State data 426 can include any BMS model data 412 or BMS state 414 compiled for transmission to ML model trainer 460. State data 426 can include a subset of BMS model data 412. State data 426 can include entire BMS model data 412. State data 426 can include a subset of BMS state 414. State data 426 can include entire BMS state 414. State data 426 can include a subset or a part of a BMS state 414. State data 426 can include any information that corresponds to the measured characteristic 434 or predicted characteristic 432. State data 426 can include a subset of BMS model data 412 or a subset of BMS state 414 that includes any information or data within a time window of an event in which a difference between a predicted characteristic 432 and measured characteristic 434 exceeds tolerance 436. The time window can include the time period during which predicted characteristic 432 is predicted and measured characteristic 434 is measured or determined. State data 426 can include BMS state 414 or BMS model data 412 within such a time window.

Interface 428 can include any computer or a digital system interface for digital communication or interaction between a vehicle 105 and a server 450. An interface 428 can include any combination of hardware and software, including scripts, functions and computer code stored in memory or operating on a processor for communicating via a network 101. An interface 428 can include an application interface or a program interface to provide a means of interaction. Interface 428 can include functionality for monitoring the network status and determining if the network between the vehicle 105 and server 450 is burdened, used or overwhelmed. Interface 428 can determine that the usage, traffic congestion or latency on the network 101 is below a threshold, and in response determine to send state data 426 across the network 101 to server 450. Similarly, interface 428 can send an updated BMS state model 464 is to be transmitted over the network, in response to determining that the usage or traffic on the network is below a threshold.

Sensors 430 can include any type and form of a sensor, a measurement device or a detector used in a vehicle 105. Sensors 430 can include a temperature sensor, a humidity sensor, a light sensor, a pressure sensor or a vibration sensor. Sensors 430 can include a gyroscope, an accelerometer or a velocity sensor. Sensor 430 can include a current sensor, a voltage sensor, a power sensor or an energy sensor. Sensor 430 can include a fluid flow sensor, a flow gauge, a flow rate sensor, a mass flow meter or a differential pressure meter. Sensor 430 can include a radiation sensor, an optical detector, a particle sensor, a molecule or gas sensor, a motion sensor, a chemical sensor, a piezo sensor or a photo-optic sensor. Sensors 430 can include a circuitry for measuring, combining or determining data based on inputs of one or more of sensors 430. A sensor 430 can include any type and form of a device, mechanism or circuit for measuring or determining any one or more of current, voltage, power, energy, operation mode, thrust, energy or power consumption or usage, torque, velocity, acceleration, distance traveled, vibration, weight, local weather data, global positioning system ("GPS") data, trip data, humidity, air pressure, temperature, battery health, drive model, drive mode, vehicle road or terrain information or data or any other information or data discussed herein.

Sensor 430 can include a combination of hardware and software determining or receiving information. Sensor 430 can include a portion of a DPS 440 receiving and processing data from BMS state 414. Sensor 430 can include a portion of DPS 440 receiving information from vehicle data 420 measured by a sensor 430, or external data 422 received from external sources, such as the internet, including for example weather data and GPS data and other information.

Server 450 can include any one or more servers operating on a network 101. Server 450 can include any combination of hardware and software, including scripts, functions and computer code stored in memory or operating on a processor for operating an ML model trainer 460. Server 450 can include computing system operating on a cloud. Server 450 can include or be a part of a base station or a cellular network. Server 450 can include a computing system operating on a virtual private network. Server 450 can include a network of servers. Server 450 can include a server farm. Server 450 can include a computing device running or processing ML model trainer 460 on one or more processors. Server 450 can include interface 428 for communicating with vehicles 105, or their DPSs 440, via network 101. Server 450 can include any functionality of a computing system 300.

ML model trainer 460 can include any combination of hardware and software, including scripts, functions and computer code stored in memory or operating on a processor for training BMS state models 404 or creating updated BMS state models 464. ML model trainer 460 can include any functionality to generate or train the BMS state model 404 or Updated BMS state model 464. ML model trainer 460 can perform the training using an artificial intelligence ("AI") model, including for example a machine learning ("ML") function or technique. The ML model trainer 460 can include an AI or ML function and use any type of machine learning technique, including, for example, supervised learning, unsupervised learning, or reinforcement learning. ML model trainer 460 can use functions such as linear regression, logistic regression, a decision tree, support vector machine, Naïve Bayes, k-nearest neighbor, k-means, random forest, dimensionality reduction function, or gradient boosting functions.

Aggregated database 462 can include one or more local or distributed databases for storing data corresponding to a plurality of vehicles 105. Aggregated database 462 can include a database management system for facilitating storing, accessing and using data stored. Aggregated database 462 can include data structures for organizing and storing data. Aggregated database 462 can include any functionality for storing state data 426 from any number of vehicles. For example, aggregated database 462 can include state data 426 from a range of vehicles 105 of the same type, such as a make and model. Aggregated database 462 can include state data 426 from vehicles 105 of a different type. Aggregated database 462 can function with or provide access to ML model trainer 460 to train an updated BMS state model 464 based on data stored in aggregated database 462.

Updated BMS state model 464 can include any BMS state model 404 modified by the ML model trainer 460. Updated BMS state model 464 can include a new state model. Updated BMS state model 464 can include a BMS state model 404 with a modified bandwidth 408. Updated BMS state model 464 can include a BMS state model 404 with a modified bandwidth selector 406. Updated BMS state model 464 can include a BMS state model 404 with a modified BMS performance predictor 410. Updated BMS state model 464 can include a BMS state model 404 with a modified predicted characteristics 432. Updated BMS state model 464 can include a BMS state model 404 with a modified comparator 424. Updated BMS state model 464 can include a BMS state model 404 with a modified tolerance 436. Updated BMS state model 464 can modify weights for any characteristic to be predicted, determined or used by the BMS state model 404. Updated BMS state model 464 can include an updated portion or a subset of a BMS state model 404, such as a portion or a subset of BMS model data 412, a portion or a subset of bandwidth 408, predicted characteristics 432 or BMS next state 416. Updated BMS state model 464 can include indices and weights for one or more functions, determinations or parameters of BMS state model 404, updated bandwidth 408, an updated bandwidth selector 406 or updated BMS performance predictor 410. Updated BMS state model 464 can be used to update or replace at least a portion of, or entirety of, BMS state model 404 and thereafter function as the BMS state model 404.

Graphical user interface (GUI) 466 can include any device, function or a system for a user to interact with electronic device using graphical icons or audio signals. GUI 466 can include a display function for displaying any function of a DPS 440, including for example BMS state model 404, bandwidth selector 406, BMS performance predictor 410 or BMS model data 412, including any bandwidth 408, predicted characteristic 432 or BMS next state 416. GUI 466 can comprise or interact with a display 335. A GUI 466 can display any values or data of BMS 418, such as any vehicle data 420, external data 422 or measured characteristics 434, on a display 335. A GUI 466 can display one or more graphs, such as a graph of characteristics (e.g., 432 or 434) over time, as shown for example in FIG. 9 herein. GUI 466 can provide functionality to a user to interact with graphs, such as graph 900, on a display 335.

One or more servers 450 can be used as a part of a system to maintain a model (e.g., BMS state model 404) that can be used by a plurality of vehicles 105. For example, one or more servers 450 can include at least one processor (e.g., 310) and coupled to memory (e.g., 315 or 325). One or more servers 450 can be configured to receive, from a first vehicle 105 of a plurality of vehicles, via a network 101, a state (e.g., state data 426) of the first vehicle. The state data 426 can be received in response to a difference between a first value (e.g., 432) of a characteristic predicted at a forecast range (e.g., 408) by the first vehicle 105 with a model (e.g., 404) trained via machine learning and a second value (e.g., 434) of the characteristic measured by the first vehicle exceeding a tolerance 436 at a first timestamp set based on the forecast range (e.g., 408). One or more servers 450 can receive, from a second vehicle 105 of the plurality of vehicles, via the network 101, a state (e.g., 426) of the second vehicle (e.g., different than the first vehicle 105) in response to a difference between a third value (e.g., 432) of the characteristic predicted at the forecast range (e.g., 408) by the second vehicle with the model and a fourth value (e.g., 434) of the characteristic measured by the second vehicle exceeding the tolerance (e.g., 436) at a second timestamp set based on the forecast range (e.g., 408). One or more servers 450 can update, via machine learning and based on the state of the first vehicle and the state of the first vehicle, the model (e.g., 404) to cause the model to make predictions that satisfy the tolerance using a second forecast range (e.g., a new and updated 408) that is different than the forecast range (e.g., the prior value for bandwidth 408). One or more servers 450 can provide the updated model to the plurality of vehicles (e.g., including the first and the second vehicles. One or more servers 450 can provide at least one of the first value, the second value, the third value or the fourth value to a display. The display can be on a server 450 or on a computing device 300 that is in communication with a server 450.

Figure 5:
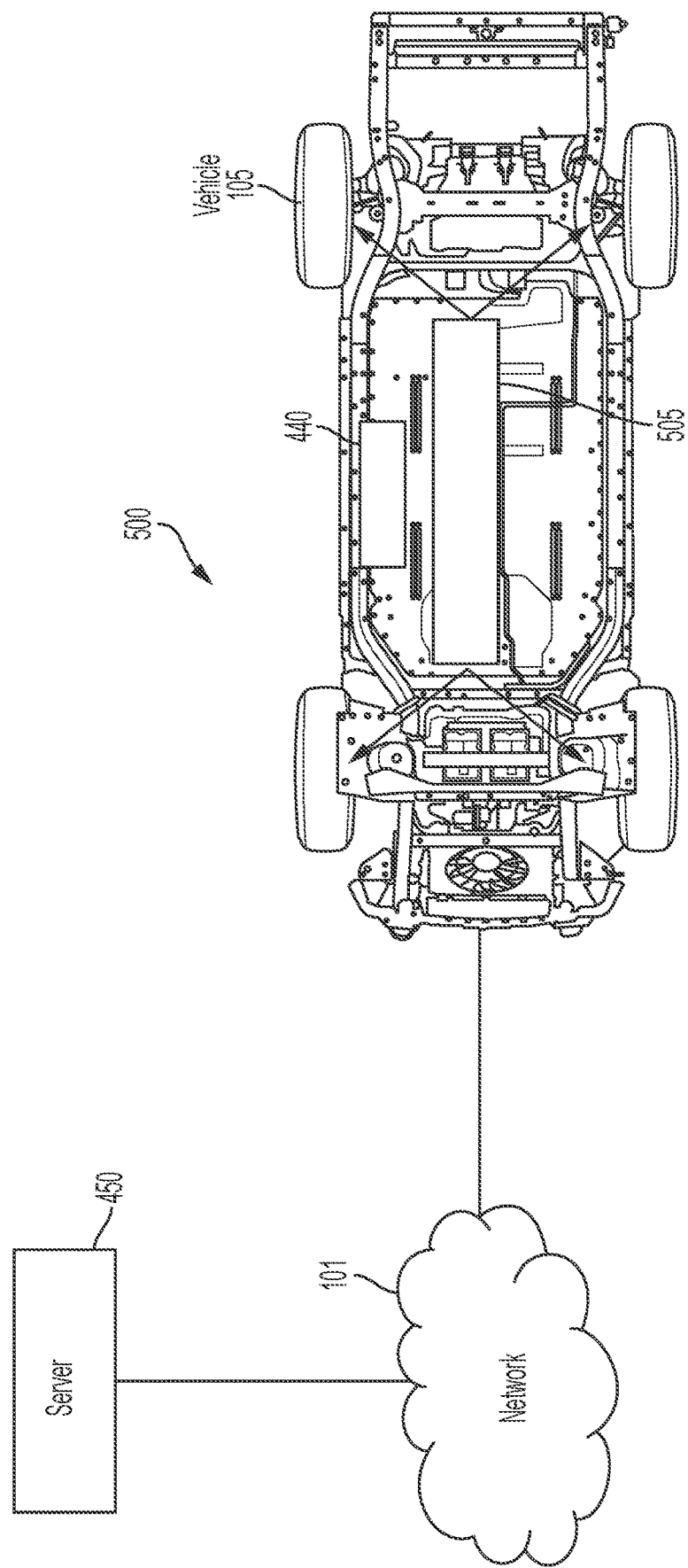
FIG. 5 is a block diagram illustrating an example of a system 500 for using a model for monitoring and predicting operation to improve power delivery to the powertrain of the vehicle.

FIG. 5 illustrates an example of a system 500 in which a vehicle 105 can utilize its DPS 440 to improve delivery or routing of energy or power to powertrain 505 of the vehicle 105. System 500 can include one or more vehicles 105 that can communicate with one or more servers 450 via a network 101. Each vehicle 105 can include a DPS 440 that can control, manage or modify the power or energy that is routed to the powertrain 505 of the vehicle 105.

Powertrain 505 can include any system for providing kinetic energy to move the vehicle 105. Powertrain 505 can include a system of any number of electrical, mechanical, electromechanical and other components. For example, a powertrain 505 can include a transmission, a differential or a driveshaft, any number of axles and constant velocity ("CV") joints. Powertrain 505 can include the wheels of the vehicle 105. Powertrain 505 can include an electric motor. Powertrain 505 can receive electrical energy from a battery pack 110 and provide kinetic energy to spin or turn the wheels of the vehicle 105. Powertrain 505 can be powered by the battery pack 110 as controlled or managed by the BMS 418.

DPS 440 can be connected with or in communication with powertrain 505. DPS 440 can be connected with or in communication with BMS 418 that is in communication with powertrain 505. BMS 418 can control the power or energy routing or distribution to powertrain 505. For example, when a vehicle 105 charges, BMS 418 can regulate power to the battery pack 110. During operation of a moving vehicle 105, BMS 418 can direct power from the battery pack 110 to the drive train. Illustrated, for example in FIG. 5, via arrows pointed to the wheels, powertrain 505 can provides power or energy to the wheels of the vehicle 105. During a downhill driving, BMS 418 can direct power from the drivetrain or powertrain 505 to the battery pack 110. DPS 440 can utilize BMS state model 404 to determine the BMS next state 416, which can be used as a BMS state 414 or as an input to determine the BMS state 414 for the next cycle (e.g., a BMS state 414 provided in ACT 805 in method 800 of FIG. 8). DPS 440 can use the BMS state model 404 to manage routing of power to the powertrain 505, depending on the output of the BMS state model 404, including for example BMS next state 416.

Figure 6:
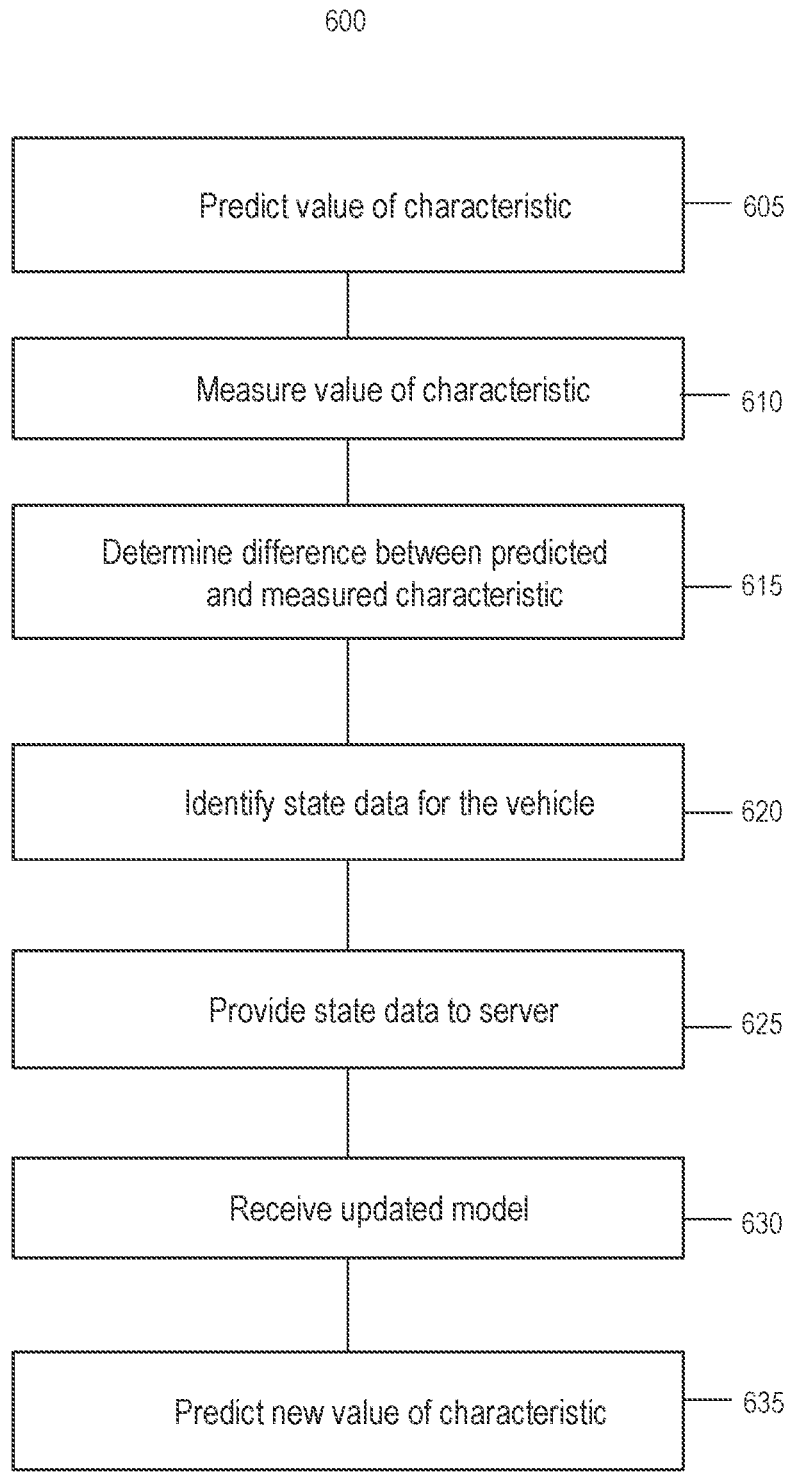
FIG. 6 is a flow diagram illustrating an example method 600 for improving a model for monitoring and predicting operation of a vehicle interacting with a remote server.

FIG. 6 can illustrate a method 600 for operating and updating a BMS state model on a vehicle 105. The method 600 can be performed by one or more system or component depicted in FIG. 4. The method 600 can include the vehicle providing its state data to the remote server to retrain the model when an error between a predicted characteristic value and a measure characteristic value exceeds a tolerance. The method can include any one or more ACTS 605 to 635. At ACT 605, the method predicts a value of a vehicle characteristic using a model. ACT 610 observes or measures the value of a vehicle characteristic. ACT 615, determines if a difference between the predicted and measured characteristic is greater than a tolerance. ACT 620 identifies a state data of the vehicle. ACT 625 provides the state data to a remote server to update the model. ACT 630 receives the updated model. ACT 635 predicts a new value of the vehicle characteristic via the updated model.

At ACT 605, the method can include the data processing system predicting a value of a characteristic of a vehicle. One or more processors can predict a first value for a characteristic of the vehicle based at least on, or using, a model (e.g., BMS state model 404) trained via machine learning. BMS state model 404 can run, execute or otherwise operate in a container (e.g., BMS model container 402) on a vehicle can predict a characteristic (e.g., predicted characteristic 432). BMS state model 404 can predict a first value for a characteristic (e.g., predicted characteristic 432) of the vehicle 105 using a model (e.g., BMS state model 404) that can be trained via machine learning (e.g., by ML model trainer 460). BMS state model can (e.g., via bandwidth selector 406) can determine a forecast range (e.g., bandwidth 408) for the first value (e.g., predicted characteristic 432) based at least on a type of the characteristic, where the type of characteristic corresponds to a battery (e.g., battery pack 110, a battery module 115 or battery cell 120) of the vehicle. BMS state model can predict the first value for the characteristic (e.g., predicted characteristic 432) of the battery of the vehicle based on the forecast range (e.g., bandwidth 408) and measure the second value for the same characteristic (e.g., measured characteristic 434 corresponding to the predicted characteristic 432). The second value can be measured or observed at a time based at least on the forecast range (e.g., 408), such as for example at the time that corresponds to the time at which the forecast range expires. The first value can be predicted after a first time interval corresponding to the forecast range. After receiving an updated model (e.g., updated BMS state model 464) from a remote server, data processing system can set up the updated model as the model in the BMS model container (e.g., replace BMS state model 404 with updated BMS state model 464) and using the updated model, data processing system can predict a third value (e.g., predicted characteristic 432) of the vehicle using the updated model. The third value can be predicted based on an updated bandwidth (e.g. forecast range). The third value can be predicted based on updated model. The updated model can include updated bandwidth selector or updated BMS performance predictor. Updated model can include BMS model data. Data processing system can determine a forecast range for predicting characteristic (e.g., 432). Data processing system can determine the first value (e.g., predicted characteristic 432) at a time stamp set based on the forecast range.

ACT 610 can include the data processing system measuring the value of a vehicle characteristic. One or more processors can measure a second value for the characteristic (e.g., measured characteristic 434) of the vehicle based at least on a sensor of the vehicle. A sensor (e.g., sensor 430) can measure a second value for the characteristic (e.g., 434) of the vehicle using any sensor, detector or an electronic circuit or a device. The sensor can measure the second value based on received information, such as information from a BMS 418 or BMS state 414. Data processing system can receive or provide BMS state (e.g., BMS state 414). BMS state can include vehicle data, external data and measured characteristic 434. The second value (e.g., measured characteristic 434) can be measured based on a time interval determined based on the forecast range (e.g., bandwidth 408). The second value can be measured at the end of the time interval determined based on the forecast range. The second value can be measured at the timestamp that can correspond to, or be based on, forecast range (e.g., bandwidth 408).

ACT 615 can include the data processing system determining if a difference between the model and a measurement is greater than a tolerance. One or more processors can determine a difference between the first value predicted based at least on, or using, the model and the second value measured based at least on the sensor is greater than a tolerance. For example, a comparator (e.g., comparator 424) can compare the first value (e.g., 432) and the second value (e.g., 434) and determine if their difference is within tolerance (e.g., 436). Comparator can determine a second difference between a third value for a characteristic of the vehicle (e.g., 432) predicted using the model (e.g., 404) and a fourth value for the characteristic (e.g., 434) of the vehicle measured using the sensor is not greater than the tolerance or is less than the tolerance. Comparator can use a first tolerance for a first type of characteristic and a second tolerance for a second type of characteristic. Tolerance can be modified by an updated model received from a remote server.

ACT 620 can include the data processing system identifying a state data of the vehicle. One or more processors can identify a state of the vehicle associated with of the difference between the first value and the second value. Data processing system can identify a state of the vehicle (e.g., state data 426) associated with at least one of the first value or the second value. Data processing system can identifying the state of the vehicle (e.g., state data 426) based on the characteristic (e.g., 432 or 434) corresponding to one or more of: operation mode, thrust, current, voltage, power, energy, power, current, voltage, torque, acceleration, distance traveled, vibration, weight, local weather data, global positioning system ("GPS") data, trip data, humidity, air pressure, or temperature. Data processing system can identify state of the vehicle based on a subset of BMS model data (e.g., BMS model data 412). Data processing system can identify state of the vehicle based on a subset of BMS state (e.g., BMS state 414). Data processing system can identify state of the vehicle in response to the expiration of the first time interval corresponding to the forecast range (e.g. bandwidth 408). State data (e.g., 426) can be gathered, assembled or compiled from any subset of BMS model data 412 and BMS state 414 corresponding to the first value (e.g., 432) and second value (e.g., 434). State data (e.g., 426) can be gathered, assembled or compiled from any subset of BMS model data 412 and BMS state 414 on which the first value (e.g., 432) or the second value (e.g., 434) is based or with which timing it coincides.

ACT 625 can include the data processing system providing the state of the vehicle to remote server to update the model. One or more processors can provide, in response to the difference determined greater than the tolerance, the state of the vehicle to a server remote from the vehicle to update the model using machine learning. Data processing system can provide the state of the vehicle (e.g., state data 426) to a server remote from the vehicle to update the model using machine learning. The state of the vehicle (e.g., 426) can be provided in response to the difference between the first value (e.g., 432) and second value (e.g., 434) exceeding a tolerance (e.g., tolerance 436). Data processing system can determine to not provide the state of the vehicle to the server in response to the second difference not exceeding the tolerance. Data processing system can transmit the state of the vehicle to the remote server in response to a determination that a network bandwidth is below a threshold. Data processing system can provide, in response to the difference exceeding the tolerance, the state of the vehicle to the server to update the forecast range (e.g., bandwidth 408) or the bandwidth selector (e.g., 406) for predicting the characteristic.

ACT 630 can include the data processing system receiving the updated model. Data processing system 449 can receive updated BMS state model 464 and use it to update or replace the prior BMS state model 404 with a portion or the entirety of the updated BMS state model 464. The updated BMS state model 464 can be used to replace the BMS state model 404 and operate as a new BMS state model 404 in the BMS model container 402. Data processing system can receive a part of the updated BMS state model 464, and update the BMS state model 404 using the received portion. For example, data processing system can receive updates to bandwidth selector 406, BMS performance predictor 410 or BMS model data 412. Data processing system can receive updated weights or parameters to use for selecting bandwidth 408 by bandwidth selector 406 or for operating BMS performance predictor 410.

ACT 635 can include the data processing system predicting a new value of the vehicle characteristic via the updated model. Data processing system 440 can, in response to updating BMS state model 404 at ACT 635, determine an updated predicted characteristic 432. BMS state model 404 can utilize updated BMS next state 416 to predict a new predicted characteristic 432. The new predicted characteristic 432 can be for the same characteristic type as the first value predicted in ACT 605. The new predicted characteristic 432 can include a different forecast range (e.g. bandwidth 408) than the forecast range of the first value at ACT 605. The new predicted characteristic 432 can include a forecast range that is smaller than the forecast range at ACT 605. The new predicted characteristic 432 can include a forecast range that is larger than the forecast range at ACT 605. Once the BMS state model 404 is updated or replaced, the new BMS state model 404 can be used to predict any number of characteristics (e.g., 432) values and continue operation in accordance with examples in ACT 605.

Figure 7:
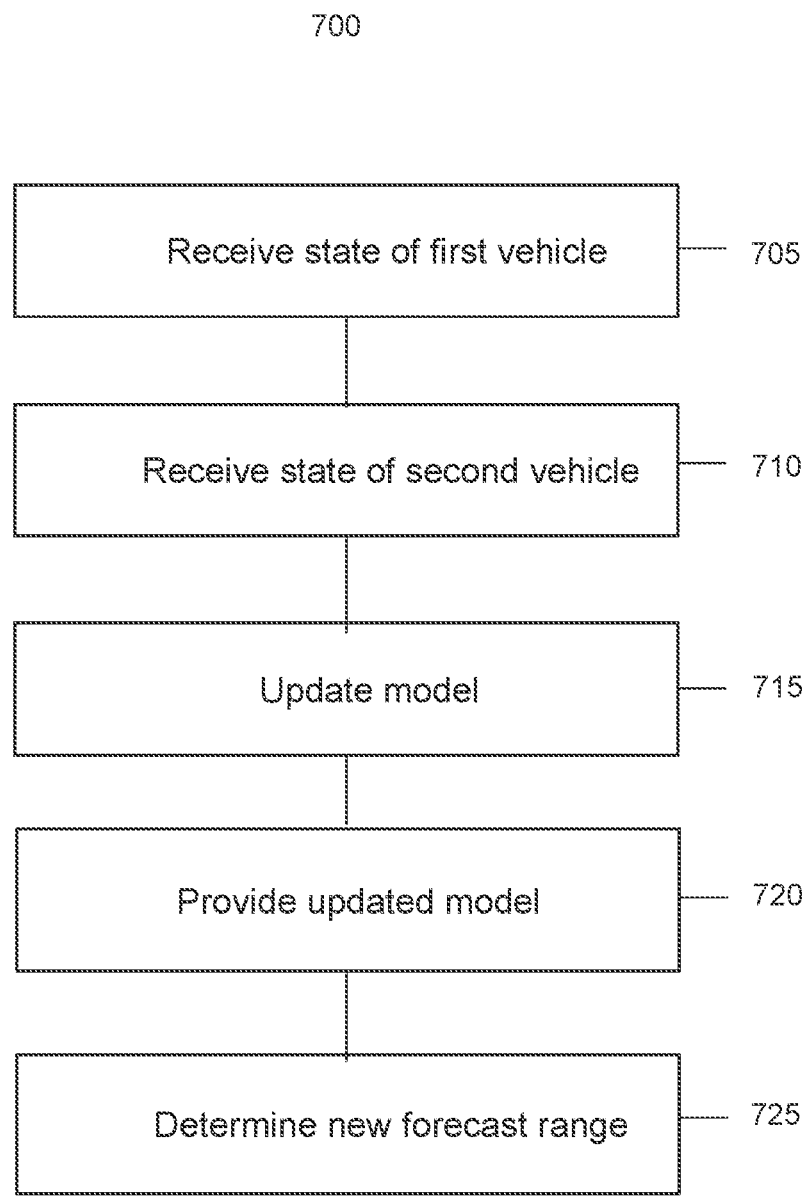
FIG. 7 is a flow diagram illustrating an example method 700 for updating a model for monitoring and predicting operation of a vehicle by a remote server.

FIG. 7 can illustrate a method 700 for training and updating the model used by one or more vehicles 105 using a server 450. The method 700 can be performed by a server 450 to train the model (e.g., updated BMS state model 464 or a new BMS state model 404) via machine learning in which an ML model trainer (e.g., 460) can receive multiple state data (e.g. state data 426) from multiple vehicles 105 corresponding to mismatches between a predicted and measured characteristic (e.g., 432 and 434) exceeding a tolerance 436. The method can include one or more ACTS 705 to 735. At ACT 705 a server of the method receives a state of first vehicle. At ACT 710, the server receives a state of a second vehicle. ACT 715 includes server updating a model based on the state of the first vehicle and the state of the second vehicle. ACT 720 includes the server providing the updated model to the first vehicle and the second vehicle. ACT 725 includes determining a new forecast range.

At ACT 705, a server can receive a state of a first vehicle. The method can include a server (e.g., 450) receiving a state of first vehicle having a difference exceed a tolerance at a forecast range. The server can receive, from a first vehicle of a plurality of vehicles, via a network, a state of the first vehicle (e.g., state data 426). The state of the first vehicle can include can be received in response to a difference between a first value (e.g., 432) of a characteristic predicted at a forecast range (e.g., 408) by the first vehicle 105 with a model (e.g. 404) trained via machine learning and a second value of the characteristic (e.g., 434) measured by the first vehicle 105 exceeding a tolerance (e.g., 436) at a first timestamp set based on the forecast range (e.g., 408).

ACT 710 the server can receive a state of a second vehicle. The method can include the server receiving a state of a second vehicle having a difference exceed the tolerance at the forecast range. The tolerance can be the same tolerance as in ACT 705. The tolerance can be for a same characteristic (e.g., 432) as in ACT 705. The server (e.g., 450) can receive, from a second vehicle of the plurality of vehicles, via the network, a state of the second vehicle (e.g., state data 426). The state of the second vehicle 105 can be received in response to a difference between a third value of the characteristic (e.g., 432) predicted at the forecast range (e.g. bandwidth 408) by the second vehicle with the model and a fourth value of the characteristic (e.g., 434) measured by the second vehicle 105 exceeding the tolerance (e.g., 436) at a second timestamp set based on the forecast range.

ACT 715 the server can update a model for the one or more vehicles. Server (e.g. 450) can update the model (e.g. updated model 404 using at least a part of model 464) based on the state (e.g., 426) of the first vehicle 105 and the state (e.g., 426) of the second vehicle 105. The server can update, via machine learning and based on the state (e.g., 426) of the first vehicle received at ACT 705 and the state (e.g., 426) of the first vehicle received at ACT 710, the model (e.g., 405) to cause the model to make predictions that satisfy the tolerance (e.g., 436). The updated model can determine a different tolerance 436. For example, the updated model can use larger tolerance or a smaller tolerance. The updated model can include a modified bandwidth selector 406 to select bandwidth differently. The updated model can include an updated BMS performance predictor to predict performance of the vehicle 105 differently.

ACT 720 can include the server providing the updated model to the first vehicle and the second vehicle. The updated model can be provided by the server (e.g. 450) to the entire fleet of vehicles of the same type as the first vehicle and the second vehicle. Vehicles of the fleet can update their models based on the updated model from the server. Vehicles of the fleet can implement the updated model inside of the container (e.g. 402) as the new model (e.g., 404) of the vehicle 105. The updated model can be implemented outside of the container.

ACT 725 can include the server determining a new forecast range. The first and second vehicles, using their updated models (e.g. 404) can determine a new bandwidth or a new forecast range for the characteristic (e.g., 432 or 434) utilized by the first vehicle and the second vehicle at ACTS 705 and 710. The updated new bandwidth (e.g., forecast range) can be different than the forecast range determined by the first and second vehicles at ACTS 705 and 710 prior to the update to the model. The updated model can provide an increased bandwidth (e.g., forecast range) or a decreased bandwidth (e.g., forecast range). For example, the updated model can provide for a new forecast range that is less than the forecast range for the same characteristic at ACTS 705 and 710.

Figure 8:
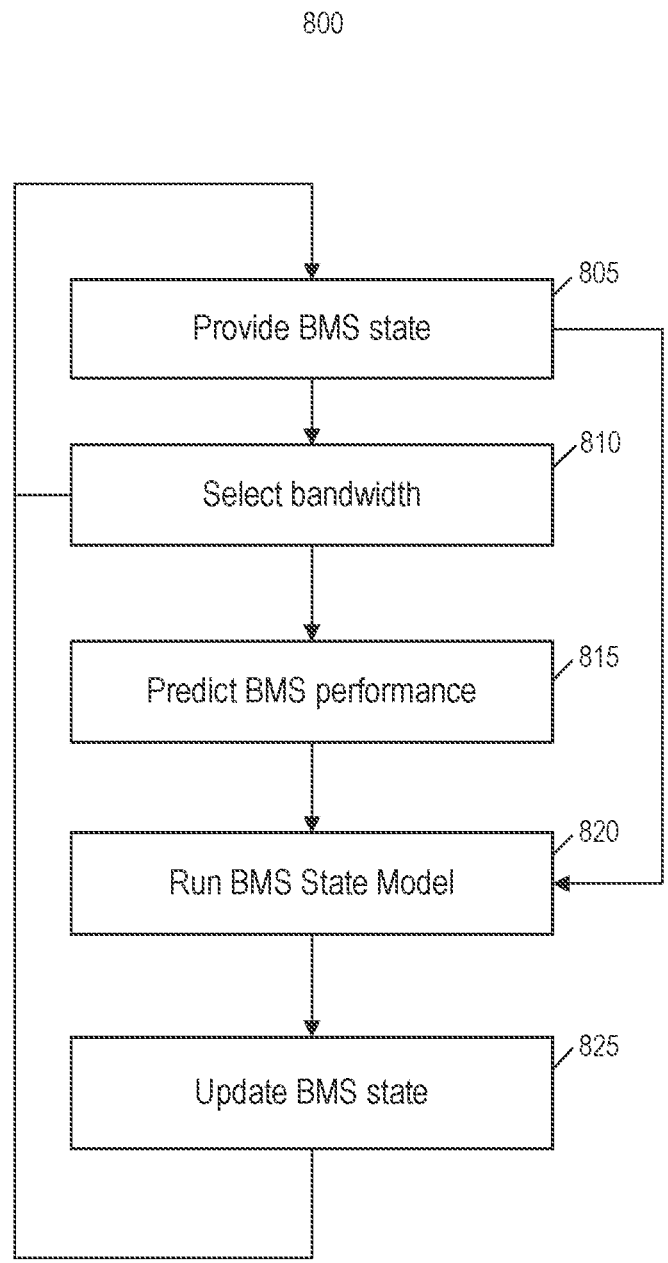
FIG. 8 is a flow diagram illustrating an example method 800 for improving a model for a BMS for monitoring and predicting operation of a battery of a vehicle.

FIG. 8 can illustrate a method 800 for using the model along with the BMS to improve operation of the vehicle. The method 800 can be performed by a data processing system on a vehicle 105 operating a BMS 418 along with a BMS state model 404. The method 800 can include any one or more ACTS 805 to 825. At ACT, 805, the method provides a BMS state. ACT 810 selects the bandwidth. ACT 815 predicts the BMS performance. ACT 820 runs the BMS state model. ACT 825 updates the BMS state, which can then be fed back to ACT 805 to provide an updated or improved BMS state for the next cycle of determination (e.g., a BMS state for a next round or cycle of ACTS 805 through 825).

At ACT 805, the data processing system can provide a BMS state. BMS state can be provided via firmware and can include BMS state 414. BMS state can be provided by a BMS 418. BMS state (e.g., BMS state 414) can include vehicle data, external data and measured characteristics. BMS state can include vehicle measurements, including sensor measurements or signals from the vehicle, external information or data, such as weather conditions data or measured characteristics. BMS state can include information, data or measurements corresponding to a drive mode of the vehicle. For example, vehicle data can include information that vehicle is in an all-purpose drive mode, energy conserve mode, off-road mode, sport mode or towing mode. BMS state can include information or data on the state of a battery (e.g. battery pack 110 or any of its components) and can include a temperature, energy or power consumption or energy or power level of a battery pack 110, battery module 115 or battery cell 120, as well as state of charge, battery health or battery usage data. BMS state can include driving conditions, which can include information or data identifying that the vehicle 105 is operating in conditions such as off-road conditions, highway conditions, hilly or mountainous conditions, icy or wet conditions, or conditions in environment in which temperature is above a predetermined threshold.

ACT 810 can include a BMS state model selecting the bandwidth. Selected bandwidth can include any bandwidth 408 and can correspond to, or include, a forecast range or a time interval over which a characteristic 432 is to be predicted. Bandwidth can be selected by a DPS 440 or any part of a BMS state model 404, such as a bandwidth selector 406. BMS state model 404 can operate in a container (e.g., 402) or outside of a container. Bandwidth can be selected based on a table or a database relating or identifying characteristics 432 with their corresponding bandwidths (e.g., forecast ranges). The table or a database can be stored by or in the BMS model data 412. Bandwidth can be determined or calculated based on one or more measured characteristics 434.

ACT 815 can include a BMS performance predictor predicting the BMS performance. BMS performance can be predicted using the DPS 440 or BMS state model 404 or any of its components. BMS performance can be predicted by a BMS performance predictor 410. BMS performance can be predicted based on BMS model data 412. BMS performance can be predicted based on the bandwidth 408. BMS performance can be predicted by inputting BMS state 414 into BMS state model 404 or the BMS performance predictor 410. BMS performance can be predicted based on BMS performance predictor 410 operating on any one or more vehicle data 420, external data 422 and measured characteristics 434. BMS performance can be predicted based on prior BMS state 414.

ACT 820 can include the data processing system running the BMS state model. BMS state model 404 can be run based on bandwidth 408 determined by bandwidth selector at ACT 515. BMS state model can be run based on BMS performance predictor determining BMS performance at ACT 520. BMS state model 404 can run a model using bandwidth selector 406 and BMS performance predictor 410. BMS state model 404 can run a model based on bandwidth 408 and output of BMS performance predictor 410. BSM state model 404 can output BMS model data 412. BMS state model 404 can determine predicted characteristics 432. BMS state model 404 can determine BMS next state 416. BMS next state 416 can include prediction for BMS state 414 at forecast range (e.g. time interval) of the bandwidth 408 in the future.

ACT 825 updates the BMS state. BMS state, such as BMS state 414, can be updated by BMS 418. BMS can update the BMS state using updated real-time data corresponding to vehicle data 420, external data 422 or measured characteristics 434. DPS 440 can update the BMS state using the BMS next state 416. For example, DPS 440 can update BMS state 414 based on predicted characteristics 432, BMS model data 414 or BMS next state 416. The output from ACT 825 can be input back into ACT 805 to help create an updated or improved BMS state for the next cycle.

Figure 9:
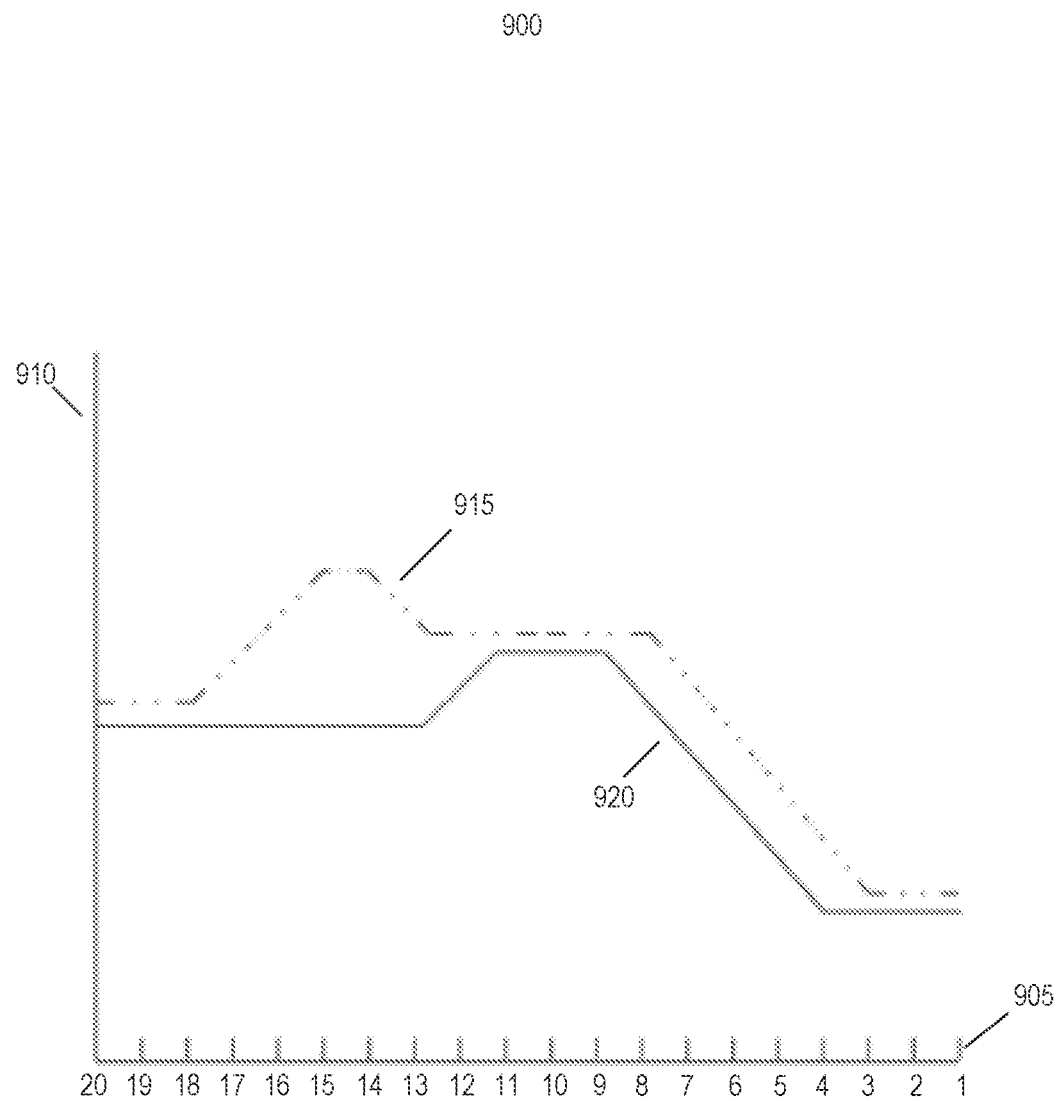
FIG. 9 is a graph 900 of plotted predicted and measured values of a vehicle characteristic in accordance with systems and methods described and illustrated herein.

FIG. 9 illustrates an example graph 900 of the operation of the BMS state model 404 or updated BMS state model 464. The graph 900 can be displayed, for example, by a server 450 or data processing system of a vehicle 105. The graph 900 can be displayed via a display device, such as via a graphical user interface. The graph 900 can refer to several cycles in each one of which a characteristic is predicted (e.g., 432) and measured (e.g., 434) in accordance with systems and methods of the present solution.

Graph 900 includes an x-axis 905 that can correspond to time intervals over which predictions and measurements of a characteristic were established or determined. Graph 900 illustrates a y-axis 910 that can correspond to the magnitude of the predicted and measured characteristic values (e.g., 432 and 434). Graph 900 can correspond to relate to any characteristic described herein, such as for example, temperature, vibration, energy or power consumption of a battery pack 110, battery health, state of charge or any other characteristic discussed herein.

Graph 900 illustrated two plot functions. Plot function 915 can correspond to a series of characteristic measurements 434 that can be acquired by sensors 430 or included in BMS state 414 that can be provided by BMS 418. Plot function 920 can correspond to values of the predicted characteristic 432 that can be determined by BMS state model 404 of the DSP 440. The x-axis 905 includes 20 lines that can denote cycles at which characteristic is predicted or observed (e.g. measured). Each line can correspond to a single cycle, and thus the graph 900 can relate to 20 cycles in each one of which the characteristic is predicted by a predicted value (e.g. 432) and observed or measured by a measured value (e.g. 434).

Reading the values on the graph 900 from right to the left, we can see that during the first three cycles (e.g. cycles 1-3 on the x-axis 905) the values for both 915 and 920 plot functions are closely aligned, corresponding to the predicted values (e.g., 432) and measured values (e.g., 434) for these three cycles remaining within a tolerance 436. The tolerance 436 can be any tolerance range or threshold, such as for example plus or minus 1 unit of measurement or prediction. Following the initial three cycles, (e.g., read from the right side on the x-axis 905), the plot function 915 of measured characteristic 434 values increases and initially diverges from the plot 920 of predicted characteristic 432 values. Starting with cycle 4 on the x-axis 905, the plot function 920 of predicted characteristics 432 values also increases and follows the plot function 915 of measured characteristic 434 values closely, remaining with the tolerance 436. At or around cycles 7 or 8, the plot function 915 for the measured characteristic 434 values levels off and remains flat for the next several cycles, as the plot function 920 of the predicted characteristic 432 catches up to plot function 915, still within the tolerance 436 range or threshold. At or around cycle 11, the plot function 920 of the predicted characteristic 432 values begins to decrease starting to diverge from the plot function 915, while the plot function 915 initially remains level for a couple more cycles, after which it increases, thereby further increasing their divergence. This divergence can be indicative of an event in which plot function 920 of predicted characteristic 432 values and plot function 915 of measured characteristic 434 values are determined by comparator 424 to have a difference that is greater than tolerance 436. This event, as shown for example between about cycle 12 through about cycle 16 can correspond to a less-known condition for which the BMS state model 404 can be further trained.

For the time period of the cycles during which the values of the characteristic (e.g., 432 and 434) have differences that are outside of tolerance 436, DSP 440 can compile state data 426. State data 426 can include any BMS model data 412 and BMS state data 414 that corresponds to the time interval or period during which divergence between plot function 915 (e.g., measured characteristic 434) and plot 920 (e.g. predicted characteristic 432) mismatch has occurred. DSP 440 can then transmit compiled state data 426 to the server 450 to have the ML model trainer 460 include the compiled state data 426 in the aggregated database 462 in order to train future versions of the BMS state model 404 (e.g., updated BMS state model 464). Graph 900 can be displayed using GUI 466 on a server 455 or any system in communication with server 455. Graph 900 can be displayed using GUI 466 on vehicle 105.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one imple- mentation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
    a data processing system having at least one processor coupled with memory, to:
        predict a first value for a characteristic of the vehicle based at least on a model;
        measure a second value for the characteristic of the vehicle based at least on a sensor of the vehicle;
        determine that a difference between the first value and the second value is greater than a tolerance;
        identify a state of the vehicle associated with the difference between the first value and the second value; and
        provide, based on the difference being greater than the tolerance, the state of the vehicle to a server remote from the vehicle to update the model.

2. The system of claim 1, comprising:
    the data processing system to modify an amount of energy routed to a powertrain of the vehicle based at least on an output of the model input into a battery management system of the vehicle.

3. The system of claim 1, comprising the data processing system to:
    determine a forecast range for the first value based at least on a type of the characteristic of a battery of the vehicle;
    predict the first value for the characteristic of the battery of the vehicle based on the forecast range; and
    measure the second value for the characteristic at a time based at least on the forecast range.

4. The system of claim 3, comprising the data processing system to:
    predict the first value for the characteristic of the battery of the vehicle using the model trained via machine learning; and
    identify the type of characteristic corresponding to one of a drive mode of the vehicle, state of a battery or driving conditions of vehicle.

5. The system of claim 4, comprising:
    the data processing system to identify:
        the state of the vehicle based on the characteristic corresponding to on one or more of: operation mode, thrust, current, voltage, power, energy, torque, acceleration, distance traveled, vibration, weight, local weather data, global positioning system ("GPS") data, trip data, humidity, air pressure, and temperature; and the drive mode of the vehicle including at least one of: an all-purpose drive mode, an energy conserve mode, an off-road mode, a sport mode or a towing mode.

6. The system of claim 1, comprising the data processing system to:
determine a second difference between a third value for a characteristic of the vehicle predicted using the model trained via machine learning and a fourth value for the characteristic of the vehicle measured using the sensor is not greater than the tolerance; and
determine to not provide the state of the vehicle to the server in response to the difference not exceeding the tolerance.

7. The system of claim 1, comprising the data processing system to:
receive an updated model from the server; and
predict a third value for the characteristic of the vehicle using the updated model; and
determine the difference between the third value and a fourth value measured using the sensor is less than the tolerance.

8. The system of claim 1, comprising:
the data processing system to transmit the state of the vehicle to the remote server in response to a determination that network bandwidth is below a threshold.

9. The system of claim 1, comprising the data processing system to:
identify a forecast range for predicting the characteristic;
predict the first value for the characteristic at a timestamp set based on the forecast range;
measure the second value for the characteristic at the timestamp; and
provide, in response to the difference exceeding the tolerance, the state of the vehicle to the server to update the forecast range for predicting the characteristic.

10. A method, comprising:
predicting, by one or more processors of a vehicle, a first value for a characteristic of the vehicle based at least on a model trained via machine learning;
measuring, by the one or more processors, a second value for the characteristic of the vehicle based at least on a sensor of the vehicle;
determining, by the one or more processors, that a difference between the first value and the second value is greater than a tolerance;
identifying, by the one or more processors, a state of the vehicle associated with the difference between the first value and the second value; and
providing, by the one or more processors based on the difference being greater than the tolerance, the state of the vehicle to a server remote from the vehicle to update the model using machine learning.

11. The system of claim 10, comprising:
modifying, by the one or more processors, an amount of energy routed to a powertrain of the vehicle based at least on an output from the model input into a battery management system of the vehicle.

12. The method of claim 10, comprising:
determining, by the one or more processors, a forecast range for the first value based at least on a type of the characteristic of a battery of the vehicle;

predicting, by the one or more processors, the first value for the characteristic of the battery based on the forecast range; and
measuring, by the one or more processors, the second value for the characteristic at a time based at least on the forecast range.

13. The method of claim 12, comprising:
predicting, by the one or more processors, the first value for the characteristic of the battery of the vehicle using the model trained via machine learning; and
identifying, by the one or more processors, the type of the characteristic corresponding to one of a drive mode of the vehicle, state of a battery of the vehicle or driving conditions of the vehicle.

14. The method of claim 13, comprising:
identifying, by the one or more processors, the state of the vehicle based on
the characteristic corresponding to one or more of: operation mode, thrust, current, voltage, power, energy, torque, acceleration, distance traveled, vibration, weight, local weather data, global positioning system ("GPS") data, trip data, humidity, air pressure, or temperature, and
the vehicle mode corresponding to at least one of an: all-purpose drive mode, energy conserve mode, off-road mode, sport mode or towing mode.

15. The method of claim 10, comprising:
determining, by the one or more processors, a second difference between a third value for a characteristic of the vehicle predicted using the model and a fourth value for the characteristic of the vehicle measured using the sensor is not greater than the tolerance;
determining, by the one or more processors, to not provide the state of the vehicle to the server in response to the second difference not exceeding the tolerance.

16. The method of claim 10, comprising:
receiving, by the one or more processors, an updated model from the server; and
predicting, by the one or more processors, a third value for the characteristic of the vehicle using the updated model; and
determining, by the one or more processors, the difference between the third value and a fourth value measured using the sensor is less than the tolerance.

17. The method of claim 10, comprising:
transmitting, by the one or more processors, the state of the vehicle to the remote server in response to a determination that a network bandwidth is below a threshold.

18. The method of claim 10, comprising:
identifying, by the one or more processors, a forecast range for predicting the characteristic;
predicting, by the one or more processors, the first value at a timestamp set based on the forecast range;
measuring, by the one or more processors, the second value at the timestamp; and
providing, by the one or more processors in response to the difference exceeding the tolerance, the state of the vehicle to the server to update the forecast range for predicting the characteristic.

19. A system to maintain a model used by a plurality of vehicles, comprising:
one or more servers having at least one processor, coupled to memory, configured to:
receive, from a first vehicle of a plurality of vehicles, via a network, a state of the first vehicle in response to a difference between a first value of a characteristic predicted at a forecast range by the first vehicle with a model trained via machine learning and a second value of the characteristic measured by the first vehicle exceeding a tolerance at a first timestamp set based on the forecast range;

receive, from a second vehicle of the plurality of vehicles, via the network, a state of the second vehicle in response to a difference between a third value of the characteristic predicted at the forecast range by the second vehicle with the model and a fourth value of the characteristic measured by the second vehicle exceeding the tolerance at a second timestamp set based on the forecast range;

update, via machine learning and based on the state of the first vehicle and the state of the first vehicle, the model to cause the model to make predictions that satisfy the tolerance using a second forecast range that is different than the forecast range; and provide the updated model to the plurality of vehicles.

20. The system of claim 19, comprising:

the one or more servers to provide at least one of the first value, the second value, the third value or the fourth value to a display.

\* \* \* \* \*